United States Patent

Hamada et al.

[11] Patent Number: 5,867,159
[45] Date of Patent: Feb. 2, 1999

[54] DOCUMENT PROCESSING APPARATUS FOR DISPLAYING A PLURALITY OF RULED LINES AT REGULAR INTERVALS

[75] Inventors: Masaki Hamada, Tokyo; Tetsuaki Yaguchi, Kawasaki, both of Japan

[73] Assignee: Canon Kabushiki Kaisha, Tokyo, Japan

[21] Appl. No.: 948,621

[22] Filed: Sep. 22, 1992

Related U.S. Application Data

[63] Continuation of Ser. No. 653,996, Feb. 12, 1991, abandoned, which is a continuation of Ser. No. 267,433, Nov. 4, 1988, abandoned.

[30] Foreign Application Priority Data

Nov. 16, 1987  [JP]  Japan .................................. 62-289144
Nov. 16, 1987  [JP]  Japan .................................. 62-289145
Nov. 16, 1987  [JP]  Japan .................................. 62-289157
Nov. 16, 1987  [JP]  Japan .................................. 62-289158
Nov. 16, 1987  [JP]  Japan .................................. 62-289167

[51] Int. Cl.$^6$ .................................................. G06T 11/60
[52] U.S. Cl. ........................................... 345/443; 707/510
[58] Field of Search ...................... 395/100, 118, 395/144, 145, 147, 148, 139–143, 779–785; 345/127, 118, 439–443; 707/505–510

[56] References Cited

U.S. PATENT DOCUMENTS

| | | | |
|---|---|---|---|
| 4,480,316 | 10/1984 | Yano et al. | 707/508 |
| 4,484,826 | 11/1984 | Horn et al. | 707/509 |
| 4,495,600 | 1/1985 | Kikuchi et al. | 395/898 |
| 4,597,045 | 6/1986 | Kiuchi | 705/30 |
| 4,675,844 | 6/1987 | Yasuda et al. | 711/101 |
| 4,760,552 | 7/1988 | Yano | 707/510 |
| 4,807,123 | 2/1989 | Komatsu et al. | 400/279 |
| 4,850,726 | 7/1989 | Kimura et al. | 400/279 |

FOREIGN PATENT DOCUMENTS 3706492  9/1987  Germany.

OTHER PUBLICATIONS

Foley et al., Fundamentals of Interactive Computer Graphics, pp. 208–213,319–339, 1982.
McComb et al., Macintosh Graphics, pp. 30–33, 60–63, 1985.
Peatroy, Mastering the Macintosh Toolbox, 1986, pp. 28,75–85, 140–143, 1986.
Simpson, The Best Book of Lotus 1–2–3, 1984, pp. 17, 61 to 93.
Andrews, Windows, 1986, pp. 111, 174 to 185.
Freihandsymboltechnik vereinfacht Mensh–Maschine–Kommunkation, Elektronki, Ed. 22, pp. 102–104 (1981).

Primary Examiner—Anton Fetting
Attorney, Agent, or Firm—Fitzpatrick, Cella, Harper & Scinto

[57] ABSTRACT

A document processing apparatus for easily editing a table includes: an input device to input data corresponding to the number of ruled lines to be displayed; position indicating device for indicating a position on a display screen; a display which can display grids on the display screen at regular intervals; an arithmetic computing circuit to arithmetically compute a line interval between a plurality of ruled lines on the basis of the number data which is input from the input device and the position indicated by the position indicating device; and a display controller for controlling the display so as to display the plurality of ruled lines at regular intervals in correspondence to the display positions of the grids on the basis of the result of the arithmetic computation from the arithmetic operating circuit and an interval between the grids. With this apparatus, ruled lines can be drawn or edited by simple operations without exerting any influence on the other cells or lines.

37 Claims, 24 Drawing Sheets

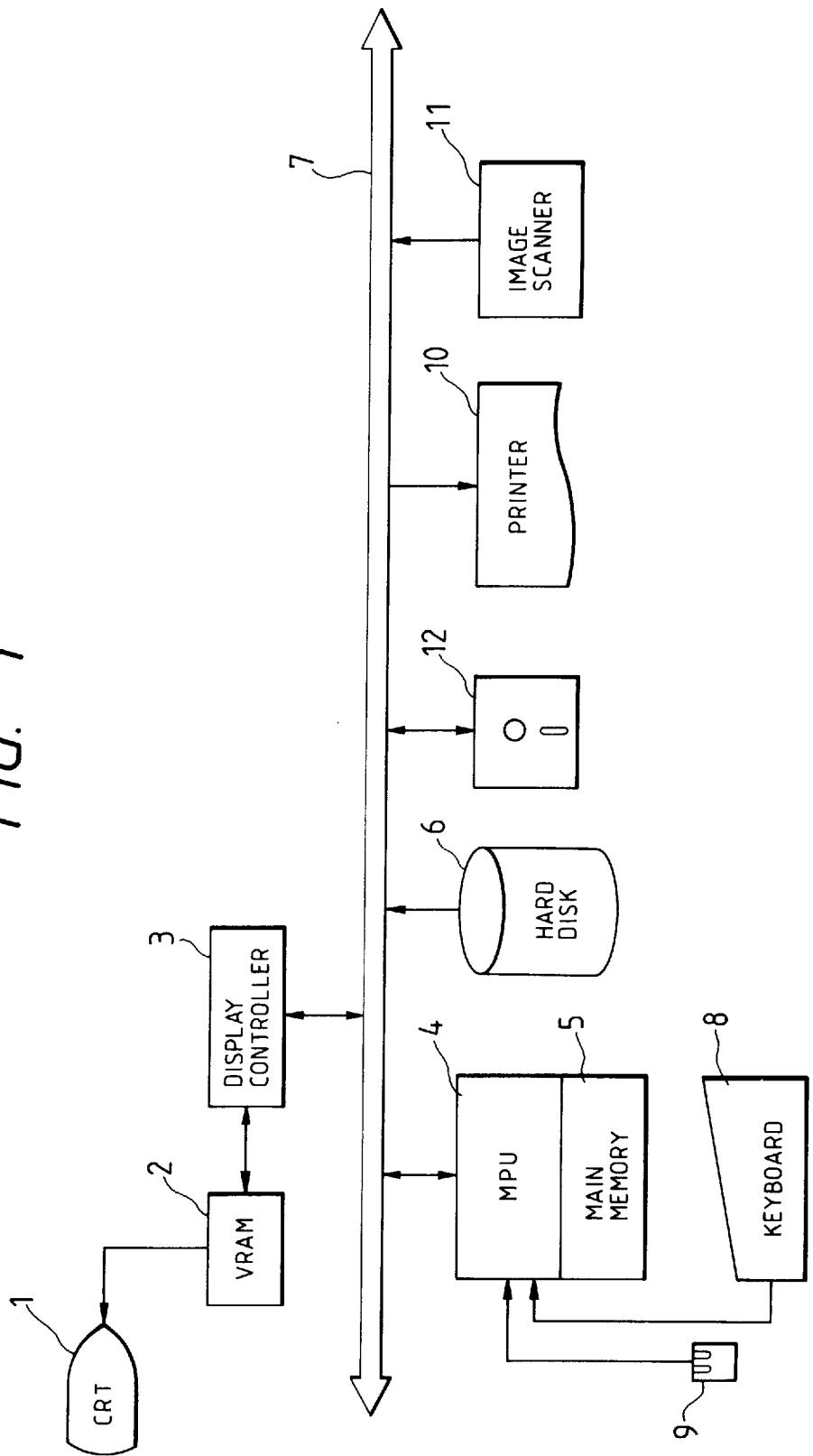

FIG. 2-1A
FIG. 2-1B
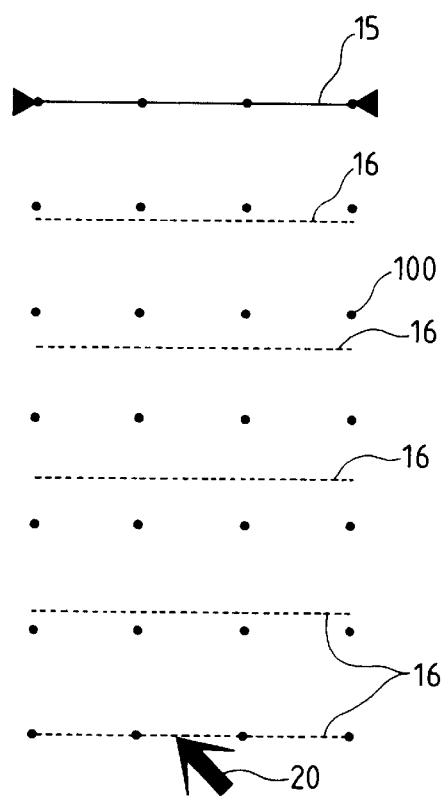
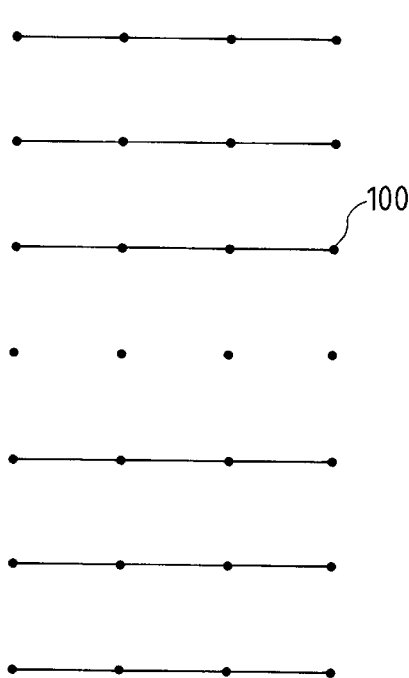
NUMBER OF
LINES=5

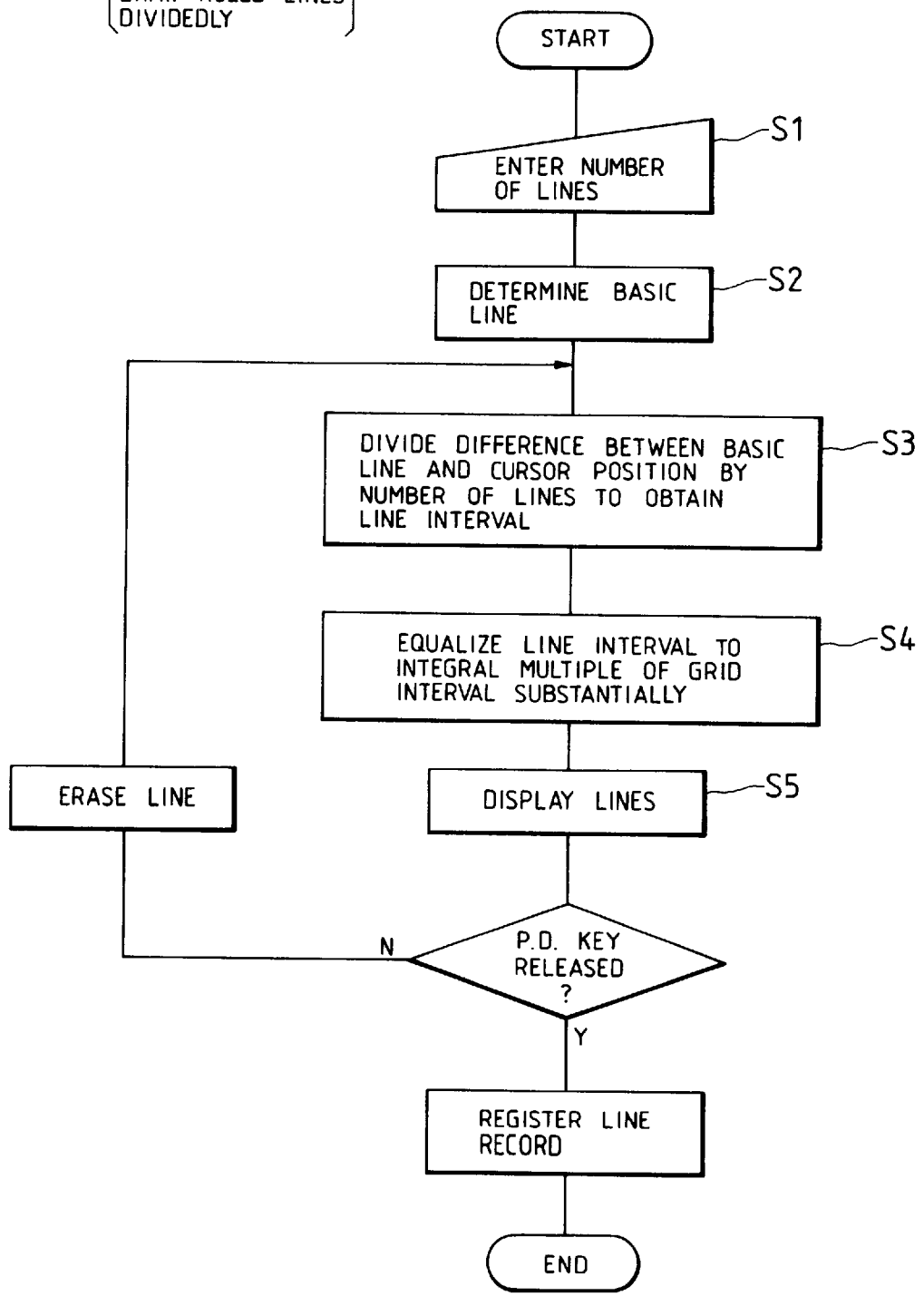

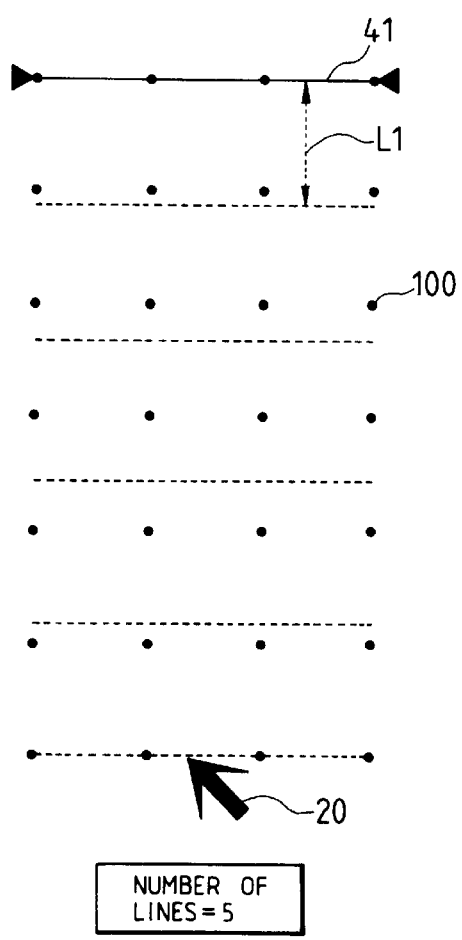
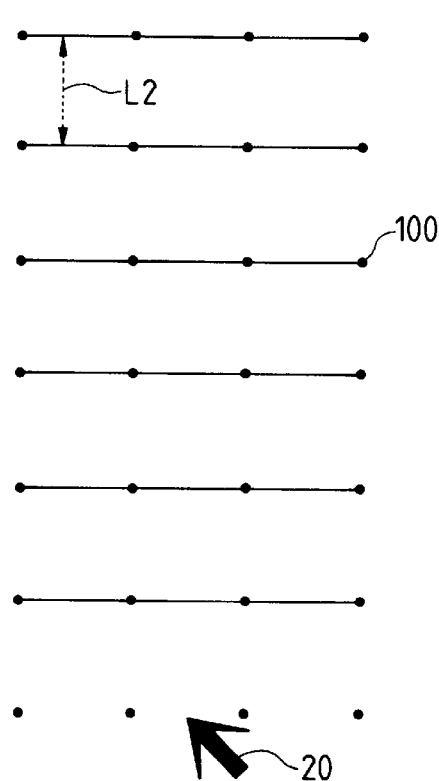
FIG. 8-1A
FIG. 8-1B

FIG. 11A (ERASE RULED LINE)
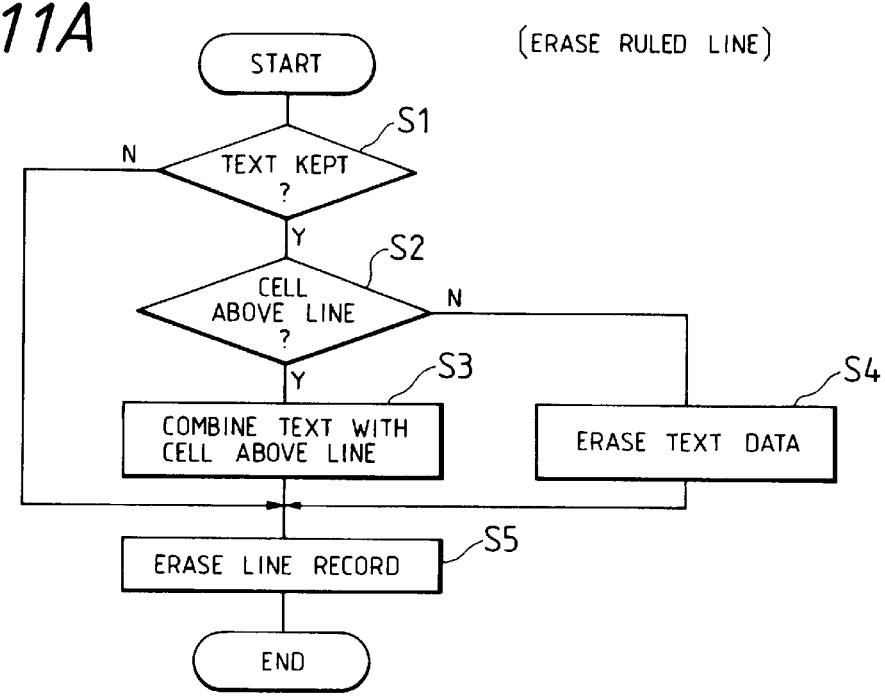
FIG. 11B
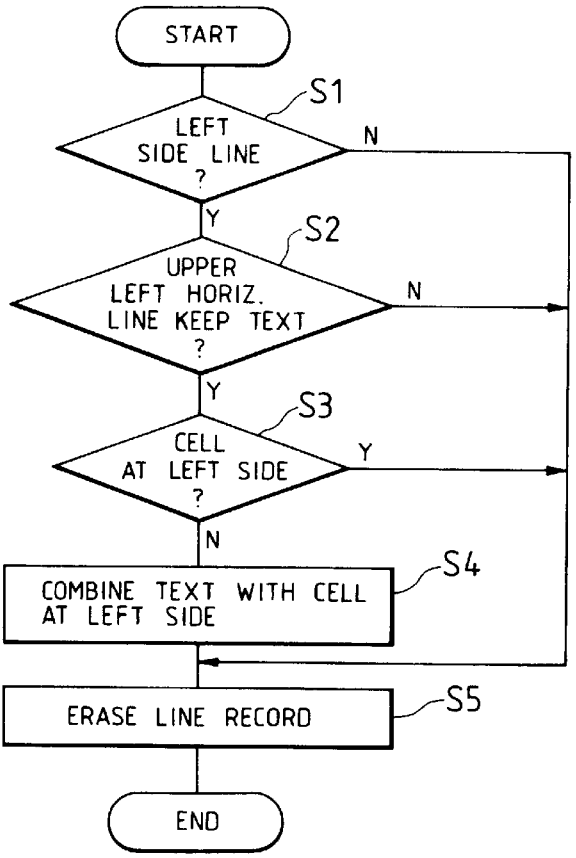

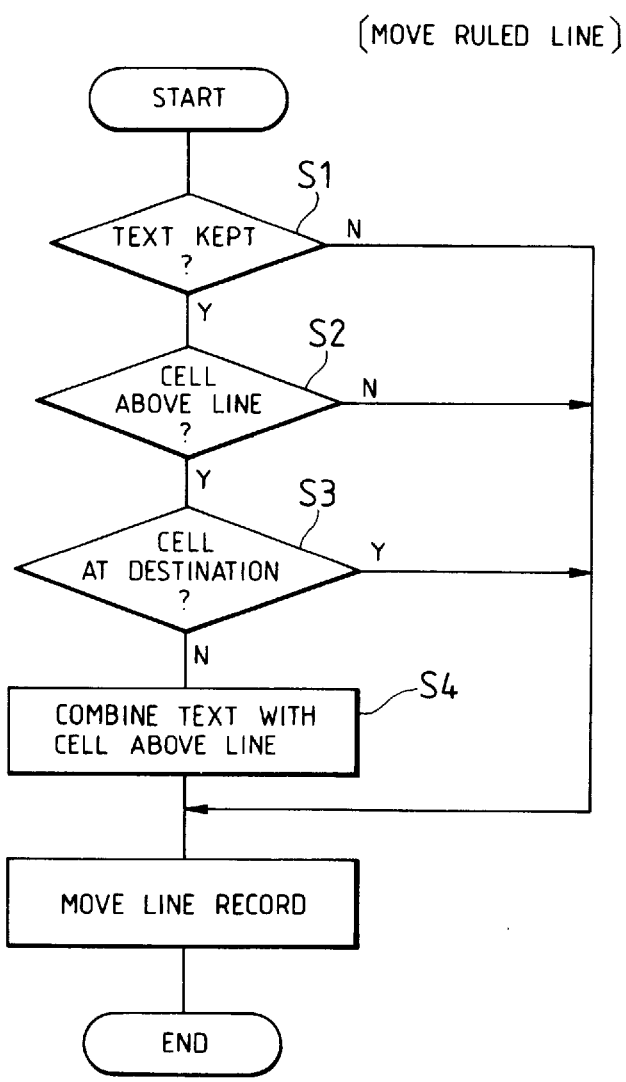

DOCUMENT PROCESSING APPARATUS FOR DISPLAYING A PLURALITY OF RULED LINES AT REGULAR INTERVALS

This application is a continuation of application Ser. No. 07/653,996 filed Feb. 12, 1991, now abandoned, which is a continuation of application Ser. No. 07/267,433, filed on Nov. 4, 1988, now abandoned.

Document Processing Apparatus

BACKGROUND OF THE INVENTION

1. Field of the Invention

The present invention relates to a document processing apparatus which can easily edit a table.

2. Related Background Art

In a table making system in a conventional document processing apparatus, the following two methods have been used as means for drawing ruled lines.

(1) Two points of a start point and an end point of a ruled line are designated.

(2) The number of lines to be drawn is designated, the distance between a ruled line as a basic line which has already been drawn and a position which has independently been designated is divided by the number of lines to be drawn to thereby obtain the positions of the ruled lines, and the ruled lines at the positions obtained are aligned to grids (100 in FIGS. 2-1A and 2-1B) as the closest lattice points.

These methods will be described with reference to FIG. 2-1. Reference numeral 15 in FIG. 2-1A denotes a basic line. The distance between the basic line and a cursor 20 (in the case where the basic line is a horizontal line, the distance is the difference in the y coordinates; in the case where it is a vertical line, the distance is the difference in the x coordinates; in the case of this example, the distance is the difference in the y coordinates is divided by the number (5) of lines to be drawn, thereby obtaining an interval between the ruled lines. The positions of five ruled lines which are obtained by this interval are as shown by broken lines 16 in FIG. 2-1A. The positions of these ruled lines are aligned to the nearest grids 100, so that a result as shown in FIG. 2-1B is obtained.

However, in tables which are generally used in documents, in spite of the fact that there are many tables in which the line widths are equal, in the case of using the method of dividing and drawing ruled lines, as shown in FIG. 2-1B, a deviation of an interval of at most one grid is caused, so that the ruled lines can hardly be drawn at regular intervals. On the other hand, since rules lines which are parallel with one ruled line and whose lengths are equal to that of this line are drawn every time in order to make one table, the drawing operations are complicated.

According to the table making system in a conventional document processing apparatus, for instance, in the case where a cell (a region surrounded by the ruled lines to input and display characters) shown by a hatched region in a table as shown in FIG. 2-2A becomes unnecessary and it is intended to change as shown in FIG. 2-2B, the following methods have been used.

(1) The horizontal lines between the cells indicated by a hatched region are erased one by one.

(2) A region surrounded by a broken line is designated and the ruled lines included therein are erased in a lump.

However, according to the method of (1), in the case of a table having a number of lines, it takes a large amounts of time. In the case of the method of (2), all of the ruled lines in the designated region are erased, the ruled lines of the cells adjacent to the unnecessary cells are erased, and the constructions of the necessary cells are lost as shown in FIG. 2-2C, so that there is a drawback such that other lines must be drawn to reconstruct the cells.

In the table making system in a conventional document processing apparatus, the erasure of characters is caused when a cell (a rectangular region surrounded by ruled lines) as a region to input and display characters becomes the non-cell by erasing the ruled lines.

This problem will now be described with reference to FIG. 2-3. $C_1$ in FIG. 2-3A denotes a cell surrounded by horizontal lines $H_1$ and $H_2$ and vertical lines $V_1$ and $V_2$. Characters $T_1$ are held by $H_1$ and $H_1$ forms the upper side of the cell, so that it is displayed. For example, when the vertical line $V_1$ is erased, $C_1$ does not become a cell and the region to display characters is extinguished. Thus, the characters $T_1$ are not displayed as shown in FIG. 2-3B. However, $H_1'$ still holds the characters $T_1$.

However, according to the foregoing system, there is the drawback that the data which cannot be seen by the operator, i.e., the data which is not used, remains.

In the table forming system in a conventional document processing apparatus, characters displayed in a cell are not displayed when a cell (a rectangular region surrounded by ruled lines) as a region to input and display characters becomes a non-cell by moving the ruled lines.

This problem will now be described with reference to FIG. 2-3. $C_1$ in FIG. 2-3A denotes a cell surrounded by the horizontal lines $H_1$ and $H_2$ and vertical lines $V_1$ and $V_2$. Characters in the cell are held by the upper left end horizontal line of the cell.

In FIG. 2-3A, the characters $T_1$ are held by $H_1$.

For instance, when the vertical line $V_1$ in FIG. 2-3A is moved to $V_1'$ as shown in FIG. 2-3B, the cell $C_1$ in FIG. 2-3A becomes a non-cell, so that no character is displayed. However, $H_1'$ still keeps the characters $T_1$. However, according to this system, there is the drawback that the data which cannot be seen by the operator, i.e., the data which is not used, remains.

SUMMARY OF THE INVENTION

In consideration of the foregoing problems, it is an object of the present invention to provide a document processing apparatus which can draw ruled lines at regular intervals by simple operations in accordance with a grid (dimension information) designated on a paper.

In consideration of the foregoing problems, it is another object of the invention to provide a document processing apparatus which can erase a plurality of cells by simple operations without exerting any influence on the other cells.

In consideration of the foregoing problems, still another object of the invention is to provide a document processing apparatus which can continuously draw a plurality of rules which are parallel with one ruled line and whose lengths are equal to that of this line by simple operations in order to construct a table.

In consideration of the foregoing problems, it is still another object of the invention to provide a document processing apparatus in which when ruled lines constructing a cell are erased, character data in this cell can be rearranged on the basis of the other cell information.

In consideration of the foregoing problems, it is still another object of the invention to provide a document processing apparatus in which when ruled lines constructing a cell are moved, character data in this cell can be rearranged on the basis of the other cell information.

BRIEF DESCRIPTION OF THE DRAWINGS

FIG. 1 is a system block diagram of an apparatus to which the present invention is applied;

FIGS. 2-1A, 2-1B, 2-2A to 2-2C, 2-3A, and 2-3B are explanatory diagrams of conventional techniques;

FIG. 3-1 is an explanatory diagram of a document editing screen;

FIG. 3-2 is an explanatory diagram of data of characters, figure, image, and form;

FIG. 5-1 is a diagram showing a state of a cross point of ruled lines;

FIG. 5-2 is an explanatory diagram of a method of holding text data in a cell;

FIG. 6 is a control flowchart for dividedly drawing ruled lines;

FIG. 8-1A and 8-1B are explanatory diagrams of arithmetic operations to dividedly draw ruled lines;

FIG. 8-2 is a diagram showing an example of a display of the result of the execution of the process to dividedly draw ruled lines;

FIG. 9-1 is a control flowchart for drawing ruled lines continuously;

FIG. 9-2 is an explanatory diagram of a display screen in the case of drawing ruled lines continuously;

FIGS. 11A and 11B are control flowcharts for erasing ruled lines;

FIGS. 12-1A to 12-1C are diagrams showing examples of a display when ruled lines are erased.

FIGS. 12-2A to 12-2E are explanatory diagrams of rearrangements of characters in a table combining process;

FIGS. 12-3A and 12-3B are explanatory diagrams of a text table;

FIG. 13 is a control flowchart for moving ruled lines;

DETAILED DESCRIPTION OF THE PREFERRED EMBODIMENT

The present invention will be described in detail hereinbelow with reference to the drawings. A "document" used is a general term which also includes sentences (including a table), a figure, an image, and the like. The invention can be also obviously applied to any system which can execute the functions of the invention such as a sole system, a system consisting of a plurality of apparatuses, or a system in which processes are executed through a network like an LAN or the like. The document process in the invention is based on a fundamental idea that processes such as drawings a document by using a pen or the like on a desk are electronically performed. In the specification, "lines are drawn", "movement", . . . , and the like, are all executed by the electronic processes.

[System block diagram]

Figures 1, 3:
Figures 2, 3:
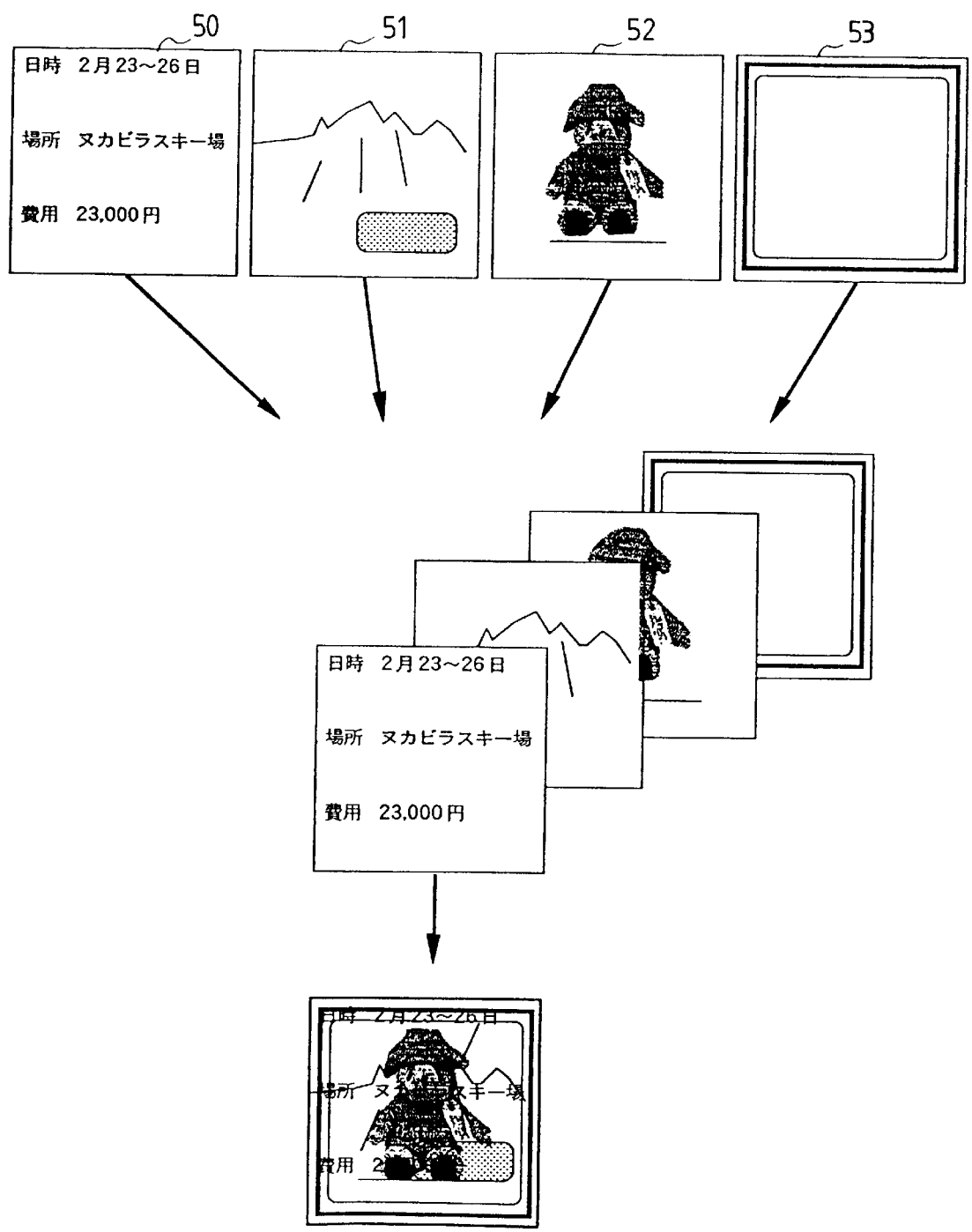

FIG. 1 is a system block diagram of a document processing apparatus of an embodiment according to the present invention. Reference numeral 1 denotes a CRT which is used in accordance with a raster scan display system; 2 is a video RAM (VRAM) to store display pattern information of one screen; 3 a display controller for controlling the writing operation of the pattern information to the VRAM 2 and the reading operation to the CRT 1; 4 a microprocessor (MPU) serving as a main control unit of the apparatus; and 5 a main memory having areas to store control programs and document data as shown in flowcharts, which will be explained hereinlater. A keyboard 8 to input character data or the like and a pointing device (hereinafter, abbreviated as "P.D.") 9 to designate a position on the CRT and to perform the input edition of data such as figure or the like are connected to the MPU 4. Reference numeral 6 denotes a hard disk apparatus. Document files, programs as shown in flowcharts, which will be explained hereinafter, and character fonts are stored in the hard disk apparatus 6. Reference numeral 10 denotes a printer to output a document made and the printer 10 has a both-sided output unit and the like; 11 indicates an image scanner to read image data such as image or the like; and 12 a floppy disk apparatus to store the document files and the like. These component blocks are connected by an I/O bus 7.

[Document editing screen]

Figures 2, 2A:
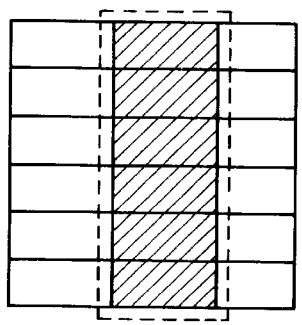
Figures 2, 2B:
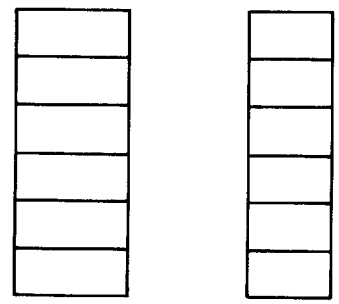
Figures 2, 2C:
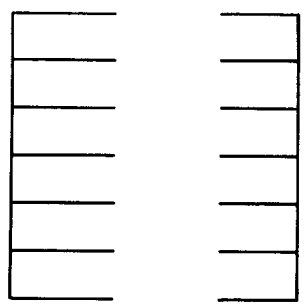
Figures 2, 3, 3A:
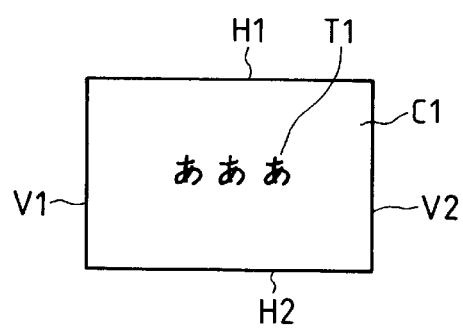

In the document editing apparatus with the foregoing construction, the character alignment based on the print combining rule, character arrangement, and its printing style are displayed on the CRT 1. An adaptive optimum document editing method can be also used by using the keyboard 8 and P.D. 9 with respect to an arbitrary region on the screen or an empty space formed by a frame in this arbitrary region. FIG. 3-1 shows an example of a document edition screen. Reference numeral 20 denotes the cursor which is operated by the P.D. 9 and 21 indicates a paper window in which the printing style is displayed on the screen. As shown in FIG. 3-2, data of characters 50, a FIG. 51, an image 52, and a form 53 can be input to the paper. The priorities of these data are predetermined and these data are overlapped and displayed in accordance with the order of the form, image, figure, and characters. It is assumed that the table combining step, which will be explained hereinafter, is considered to be substantially equal to the characters. Reference numeral 22 in FIG. 3-1 denotes a user menu. A Katakana and Kanji (Chinese characters) window for inputting characters and a function keys for selecting a function are displayed on the user menu 22. An input mode of the keyboard, a message for the operator, or the like is displayed on a status line 23. Reference numeral 24 denotes a region (hereinafter, called a frame) formed by a frame on the paper. Data of characters (small combine) or table combining step, and figure and image can be input into the frame. These data can be overlapped and displayed in accordance with their priorities in a manner similar to the case of the paper.

[Word processing edition]

Each of the editing functions will now be described. In the word processing edition, characters in the paper or frame can be input and edited. Characters are input by using the function of the Roman letter to Katakana conversion, Katakana to Kanji conversion, or the like. A format is assigned for each paper. A paper size, a position of a print area as a region to input and edit a document or the like in the paper, the number of columns, the number of lines in a column, a character size in a sentence, a type style (Ming style, Gothic style, etc.), nombre (page numbers), sub-heading (heading out of a column), and the like are defined. Characters are combined in accordance with this format and displayed or printed. On the other hand, a partial change of the character size and type style, a character decoration such as underline, small dot for emphasis, agate, super-script character, subscript character, or the like, a line adjustment such as centering, shift to the right end, shift to the left end, uniform arrangement, and the like are also executed by the editing function. Further, a search/replace function to search a character train and to replace with another character train is also provided. In addition, there is also provided a floating frame editing function to form an empty space surrounded by a floating frame which moves so as to follow characters in association with the movement, input, and deletion of characters, to change the size of frame or the like, to erase the frame, and the like.

[Figure edition]

In the figure edition, there are provided an editing function to input a figure such as straight line, circle, rectangle, ellipse, or the like, to change face kind or line kind, and to perform the movement, copy, erasure, deformation, rotation, enlargement, reduction, or the like of a figure and a function of a multi-layer structure which consists of a plurality of layers and can perform the display and edition of each layer solely and can overlappingly display a plurality of layers, and the like.

[Image edition]

In the image edition, there are provided functions such as input of an image from the image scanner, rotation, reversal, movement, copy, and erasure of image data, dot-unit-basis edition to perform the edition on a dot unit basis, and trimming to partially fetch the image data.

[Fixed frame edition]

Different from the floating frame, in the fixed frame edition, there are provided functions such as formation of an empty space surrounded by a frame which is formed at a fixed position on a paper and does not depend on the movement of characters, change in size, movement, erasure, and the like.

[Table combining process]

A table combining process as a main process in the invention will now be described. In the table combining process, the edition can be performed for a frame having no small frame. The functions are largely divided into two editions of a ruled line edition to draw, move, or erase ruled lines and a character edition to input characters or to decorate an underline, agate, or the like. The ruled line edition is performed in order to make a table by drawing ruled lines and to make a rectangular region called a cell which is surrounded by the ruled lines. Characters can be input to this cell. The character edition is executed in order to input characters into the cell formed by the ruled line edition. A good complicated table can be easily promptly made by using these two editing functions.

[Table combining data table layout]

Figure 4:
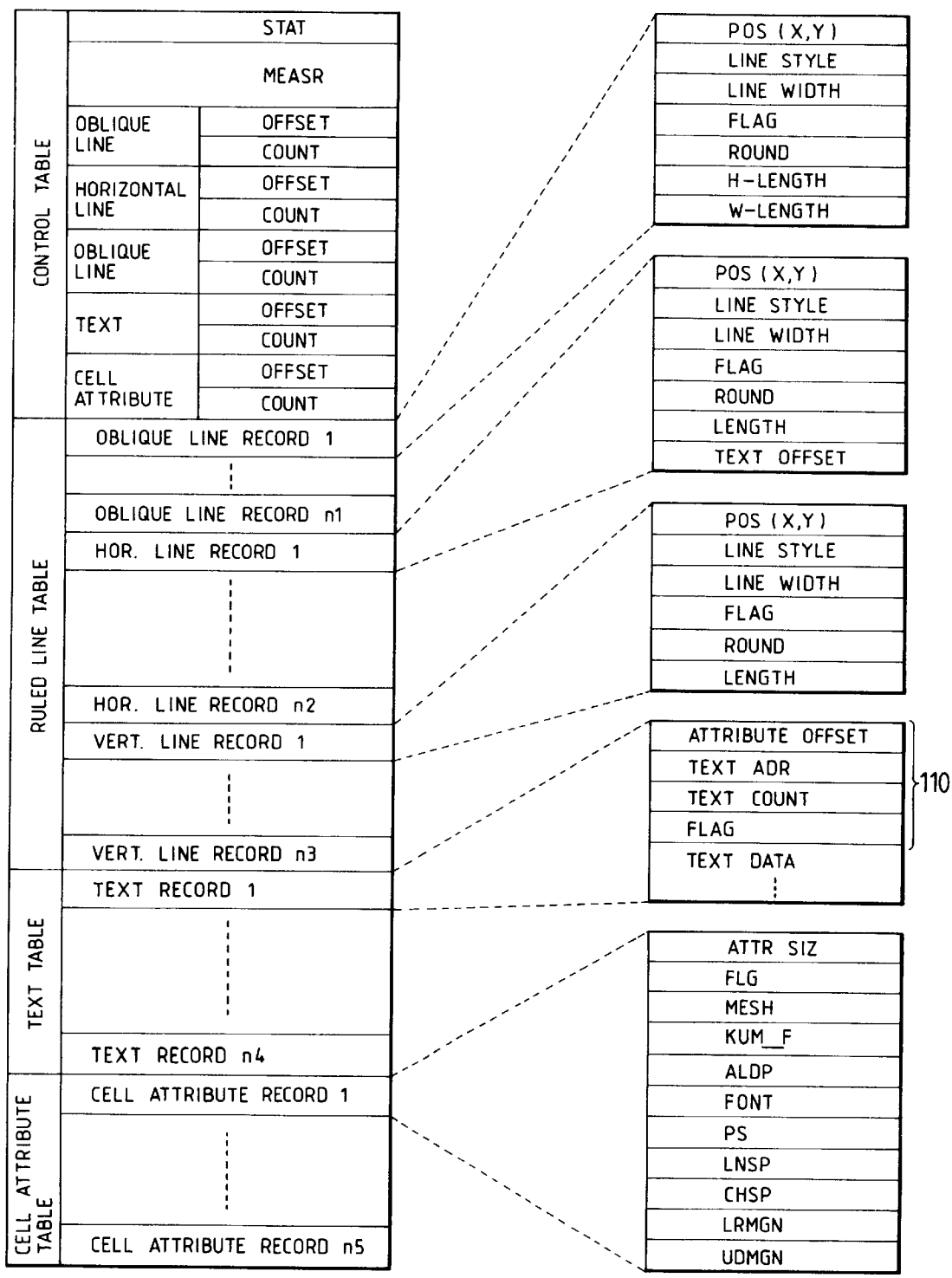
FIG. 4 is an explanatory diagram of a table combining data table.
Figures 1, 5:
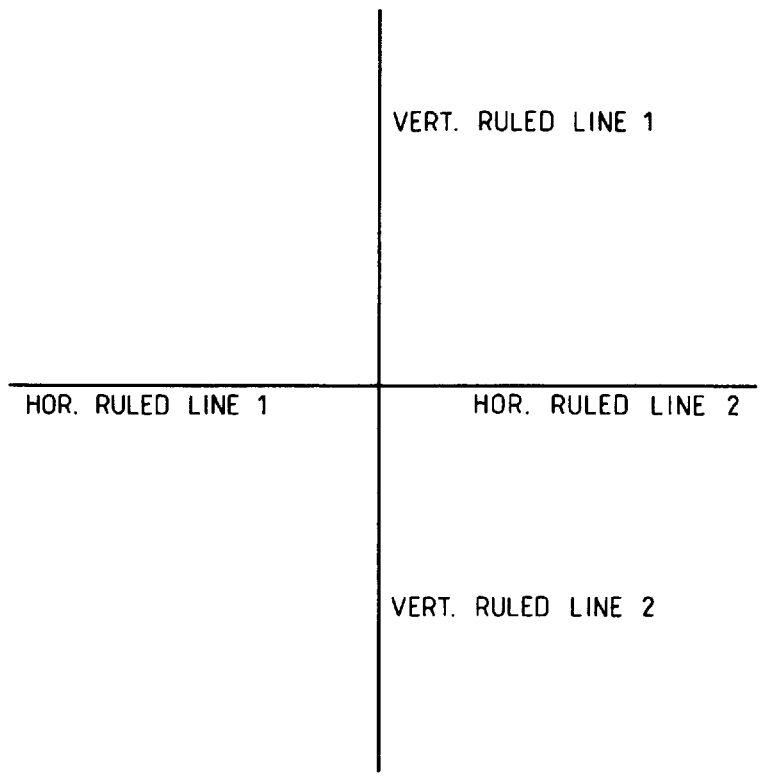
Figures 2, 5:
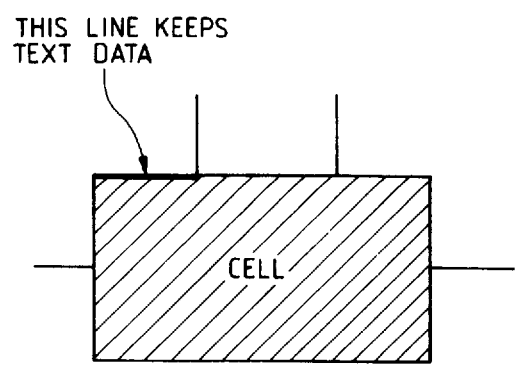

FIG. 4 is a diagram showing an example of a layout of a table combining data table as a part of document data in the hard disk. This layout comprises a control table, a ruled line table, a text table, and a cell (a frame such as shown in FIG. 5-2) attribute table. The control table is provided to manage the whole table combining data table. The number indicative of a table combining data format is stored in "stat". Control information to convert an internal storage coordinates unit to a CRT or printer coordinates unit is stored in "measr". Next, an offset and a count of each of the oblique line, horizontal line, vertical line, text, and cell attribute are stored. The offset is the data indicative of the oblique lines, horizontal lines, and vertical lines of a ruled line table and also indicative of start addresses of table regions of the text data table and cell attribute table. The count represents the number of records of each of the oblique lines, horizontal lines, vertical lines, text, and attribute. There are n1 oblique line records, n2 horizontal line records, n3 vertical line records, n4 text records, and n5 cell attribute records. The regions of the ruled line table, text table, and attribute table can be known by the offsets and counts.

[Ruled line table in FIG. 4]

The ruled line table is a set of information of the oblique lines, horizontal lines, and vertical lines. The start position of each line is stored in "POS(x,y)". Information indicative of the line kind of each line such as solid line or alternate long and short dash line are stored in "line style". Information of a thickness of each line are stored in "line width". Lock information of each ruled line are stored in "flag". Corner/round information of each cross point of the horizontal and vertical lines are stored in "round". Information of a length of each line are stored in "length" of each of the horizontal line record and vertical line record. Information of lengths in the horizontal and vertical directions are stored in "w-length" and "h-length" of the oblique lines. In "text offset" of the horizontal line record, the offset indicating to which position in the text table the text data corresponding to the cell constructed by the horizontal lines is stored is stored. When no text is provided, the-value of −1 is stored. The records of the ruled line tables are arranged in a manner such that the oblique and horizontal lines are arranged in accordance with the increasing order of the x coordinate and the vertical lines are arranged in accordance with the increasing order of the y coordinate on the basis of the start position information indicated by POS(x,y). The ruled lines can be also considered to be elements constructing the cell.

[Text table in FIG. 4]

The text table consists of variable length text records. An attribute of a text, for instance, combining direction (vertical combination/horizontal combination), size of character, character adjustment such as shift to the left end, shift to the right end, centering, or the like, and offsets indicating to which positions in the cell attribute table the data representative of the number of spaces between lines, the number of spaces between characters, and the like are stored are stored in "attribute offset". The number of characters of the text data is stored in "text count". The text data relates to an arrangement of character codes and consists of two-byte codes of the value of the text count. A flag indicative of a display state or the like of the cell is stored in "flag". One text record exists for each cell having characters or attribute. One attribute record for this text record also certainly exists. However, the same attribute is assigned to the texts having the same attribute.

[Cell attribute table in FIG. 4]

The cell attribute table consists of cell attribute records of variable lengths. The number of bytes indicative of a size of one cell attribute is stored in "attrsiz". A flag indicating whether the record is used or not is stored in "flg". The inside drawing pattern number of a cell is stored in "mesh". A flag indicating whether the table combining process is the vertical combining process or horizontal combining process, a flag indicating which one of the number of spaces between characters and the character pitch has been designated, and a flag indicating which one of the number of spaces between lines and the line pitch has been designated are stored in "kum-f". Information regarding the character adjustment such as shift to the top, shift to the bottom, shift to the left end, or shift to the right end, rotating angle in the rotational display, and display system (blank display, superimposes or the like) are stored in "aldp". Information of a character style (Ming style, Gothic style, or the like) are stored in "font". A size of character is stored in "ps". Values of a line pitch or the number of spaces between lines and a character pitch or the number of spaces between characters are stored in "lnsp.chsp" in accordance with the data stored in "kum-f". Values of right, left, upper, and lower margins are stored in "lrmgn, udmgn".

Figure 10:
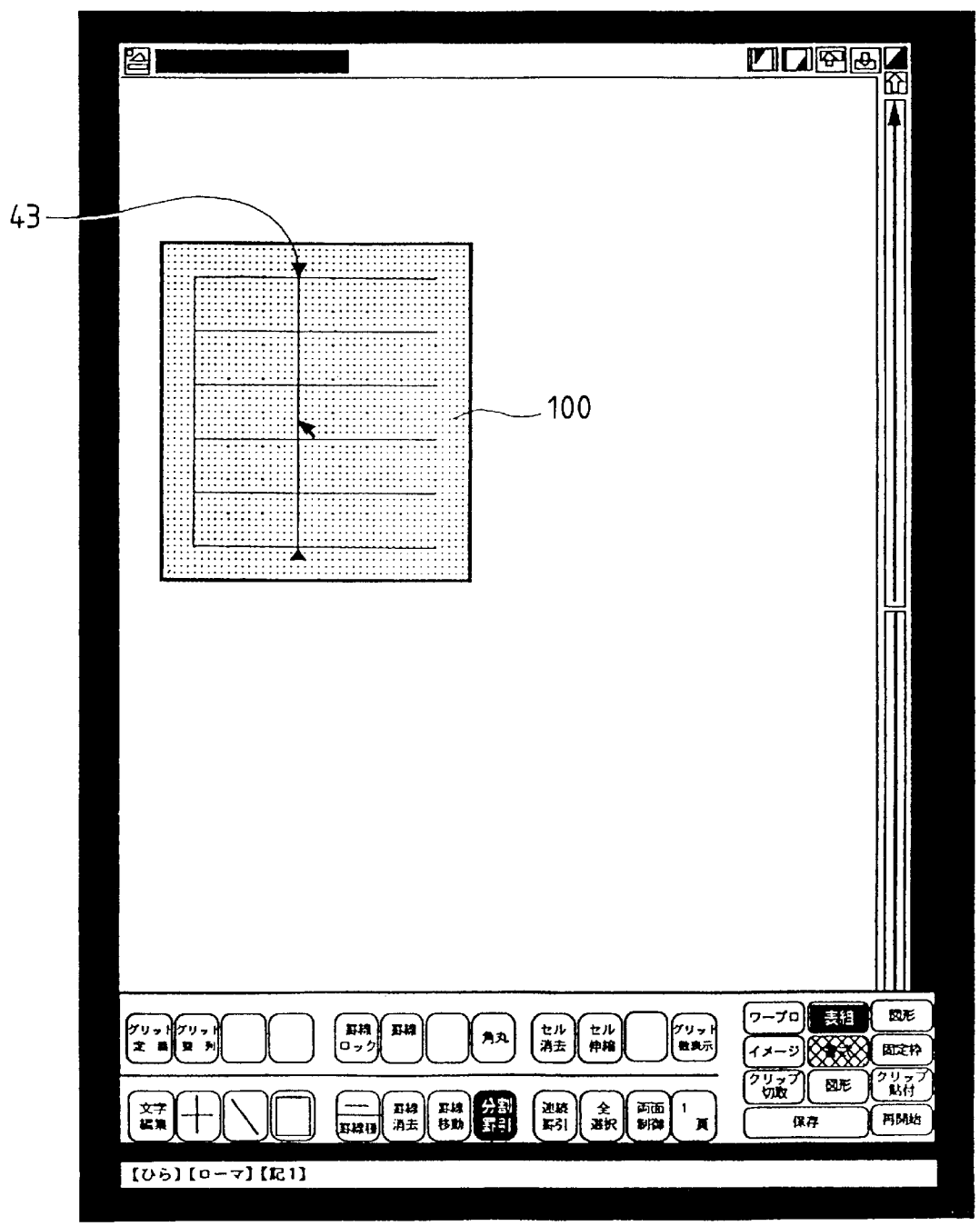
FIG. 10 is an explanatory diagram of the step to draw ruled lines continuously.

The operator can draw ruled lines like a figure as shown in FIG. 10, as will be explained hereinlater, by using a method of dividedly drawing ruled lines or a method of continuously drawing ruled lines, which will be explained hereinlater. However, as internal processes, the vertical and horizontal ruled lines are divided at cross points as shown in FIG. 5-1 and stored. Since the ruled lines are stored in this manner, when a table is drawn, it is drawn like a figure and when performing the edition (erasure of only the left side of one cell or the like) for each cell, each element can be edited. On the other hand, among the ruled lines constructing each cell, the left upper end horizontal line (ruled line indicated as a bold line in FIG. 5-2) keeps the text data of each cell (FIG. 5-2).

[Draw ruled lines dividedly]

Figure 7:
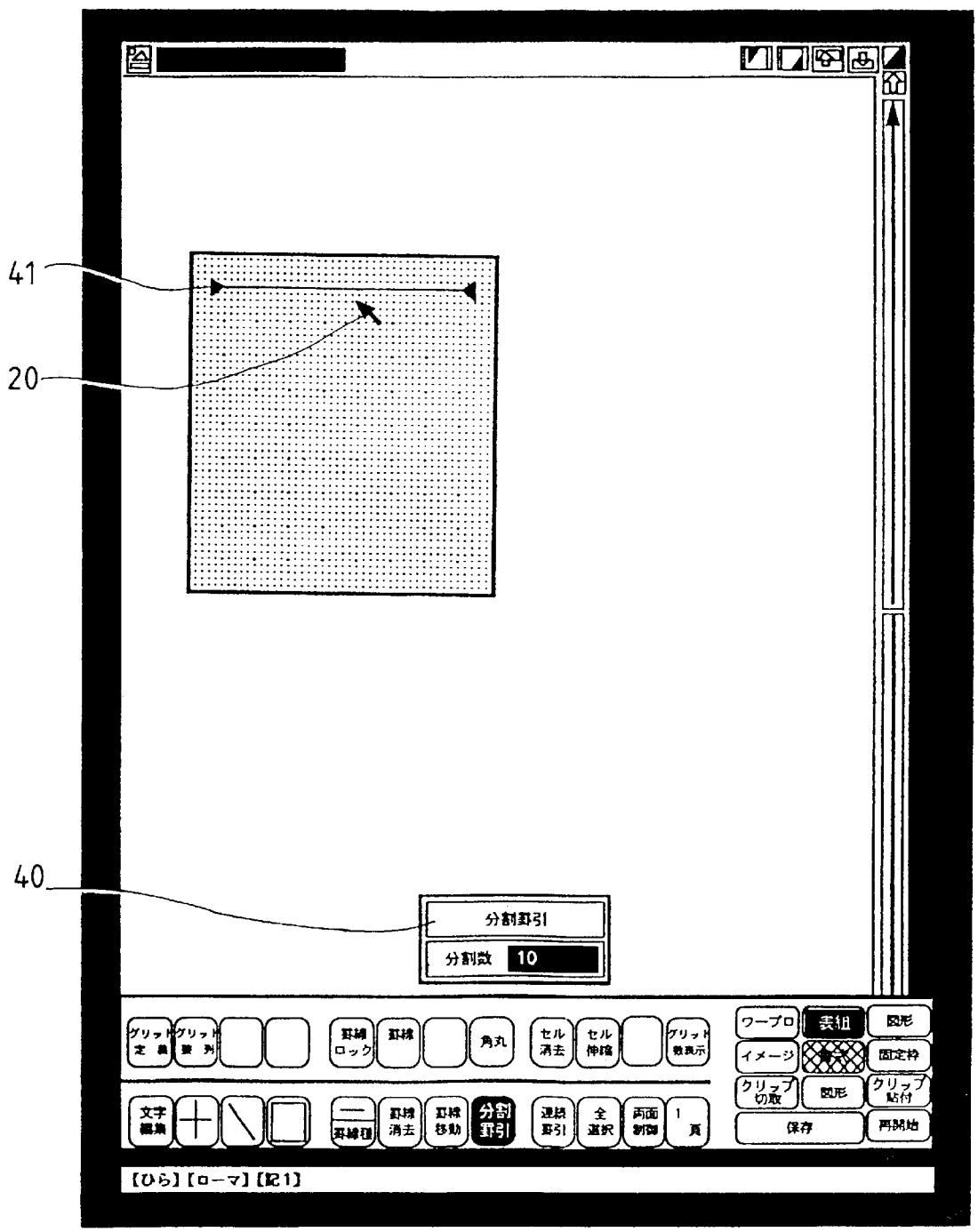
FIG. 7 is an explanatory diagram of a display screen in the case of dividedly drawing ruled lines.
Figures 2, 8:
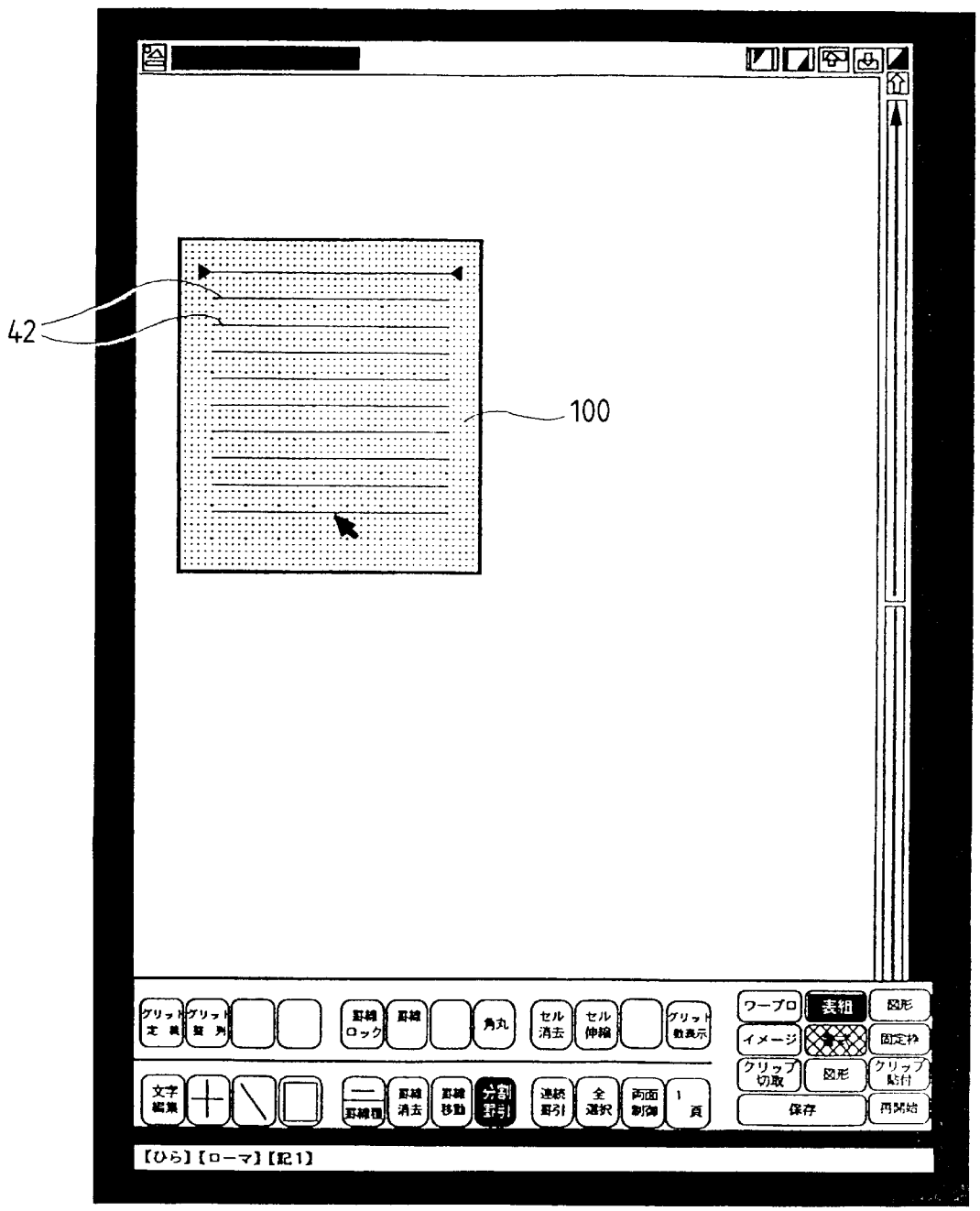
Figures 1A, 12:
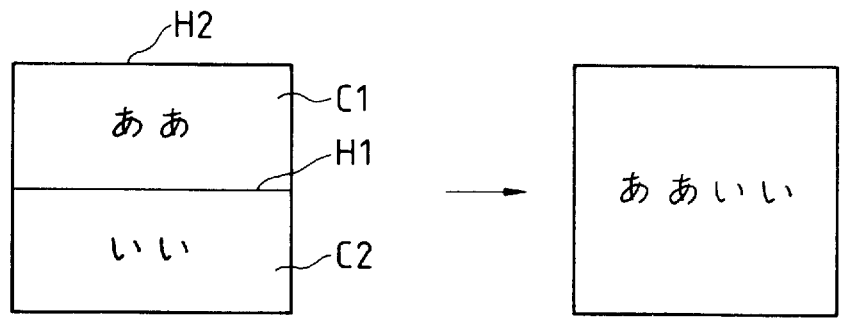

A method of drawing a plurality of parallel ruled lines at regular intervals will now be described with reference to FIGS. 6 to 8. FIG. 6 is a control flowchart. First, when the process to dividedly draw ruled lines is designated by the keyboard or P.D., the number of lines input window 40 in FIG. 7 is displayed. In step 1 in FIG. 6, the number (the number of lines) of parallel rules lines (divided ruled lines) of regular intervals is input by the keyboard. FIG. 7 shows a state in which the number of lines is set to 10. In step 2, a basic line 41 as a reference of the divided ruled lines in FIG. 7 is determined. The basic line is determined by a method whereby the cursor 20 is moved by the P.D. onto a ruled line which has already been drawn and the P.D. key is once pressed (hereinafter, referred to as a one click access) or a method whereby a ruled line is extended (the P.D. key is pressed at the start point of a ruled line and the cursor is moved to the end point with the P.D. key pressed continuously and this key is released). In the next step 3, the cursor is moved to an arbitrary position, the P.D. key is pressed, a distance between the basic line and the position of the cursor (i.e., the difference between the y coordinates in the case where the basic line is a horizontal ruled line; the difference between the x coordinates in the case where it is a vertical line) is obtained and divided by the number of lines, thereby obtaining the line interval ($L_1$ in FIG. 8-1A). In FIG. 8-1A, the basic line is a horizontal ruled line. Next, the line interval obtained in step 3 is equalized to an integral multiple of the grid interval in step 4 so that all of the divided ruled lines are aligned on the grids 100. The equalization in this case is performed in the following manner.

$$\frac{\text{line interval} + 1/2 \text{ of grind interval}}{\text{grid interval}} \times \text{grid interval}$$

Figures 1B, 12:
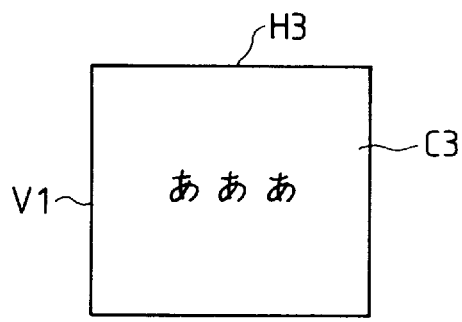

Since the decimal points are discarded in the division, a value which is integer times as large as the grid interval is obtained ($L_2$ in FIG. 8-1B). In the next step 5 in FIG. 6, the divided ruled lines of only the number of lines are displayed at the line interval obtained in step 4 (42 in FIG. 8-2). The processes in step 3 and subsequent steps in FIG. 6 are repeated until the P.D. key is released. The operator moves the cursor with the P.D. key continuously pressed until a proper line interval is obtained. In response to this operation, a plurality of ruled lines of regular intervals are displayed in a realtime manner. By releasing the P.D. key, the line interval is determined and the divided ruled line record is registered.

[Draw ruled lines continuously]

Figures 1, 9:
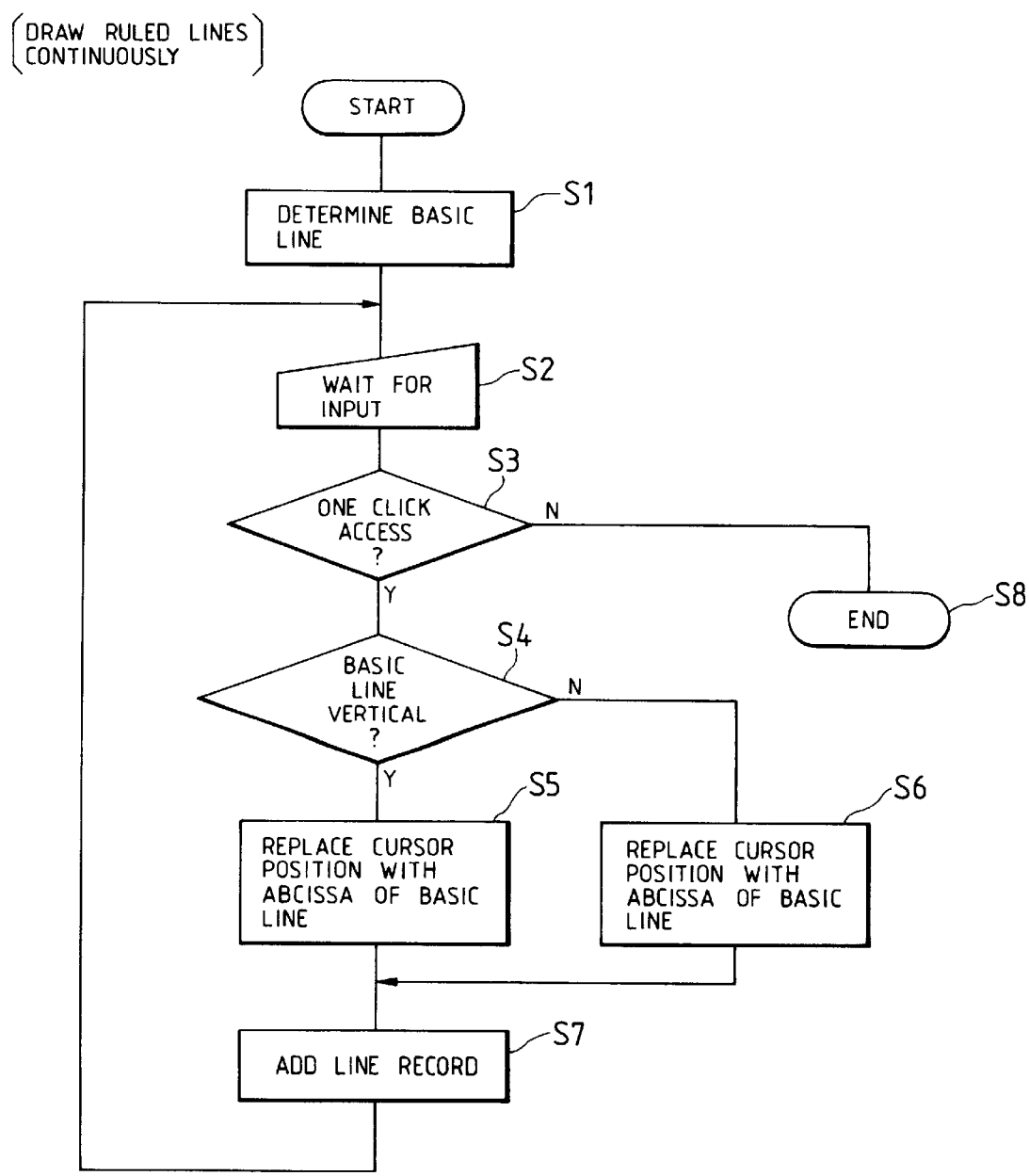
Figures 2, 9:
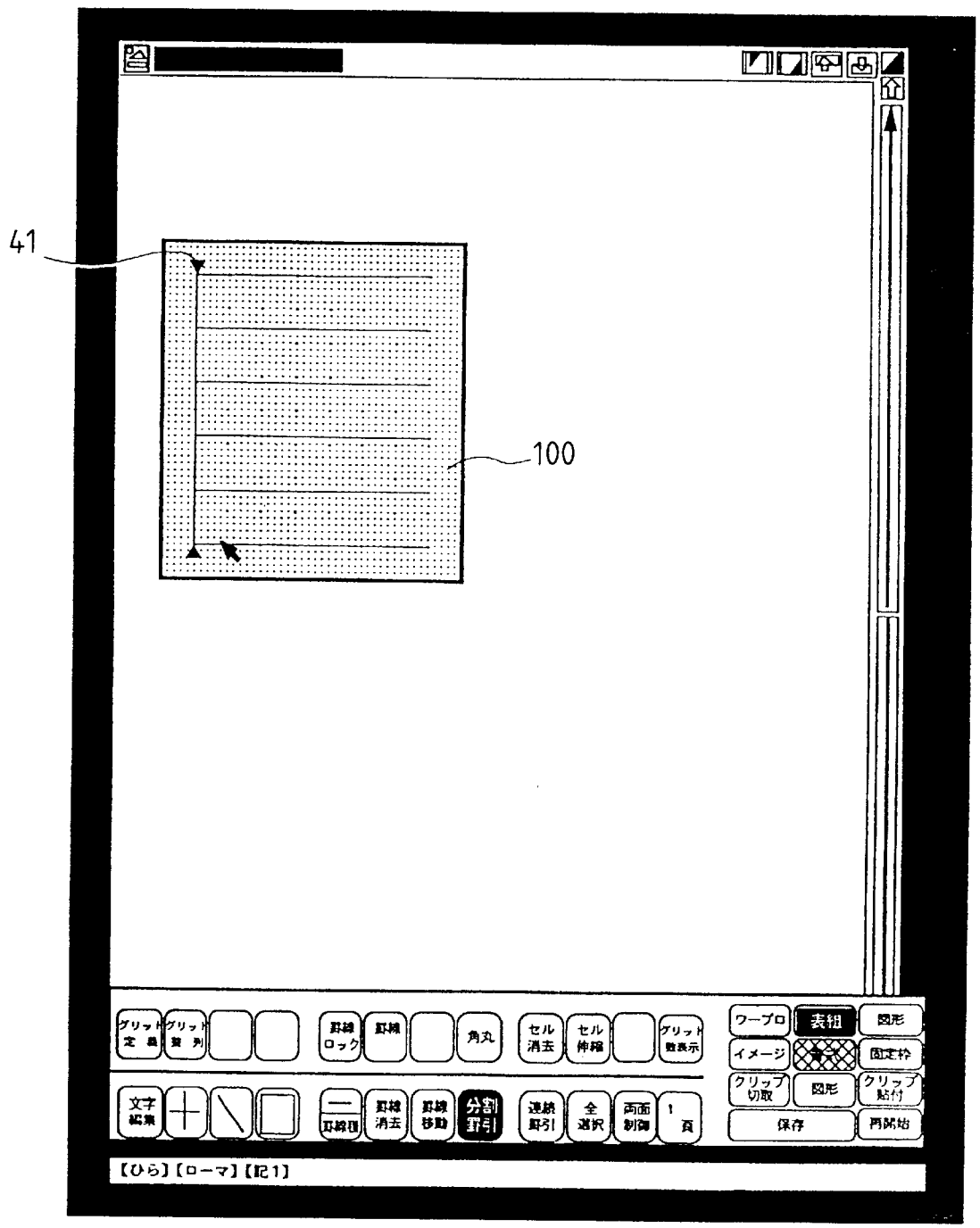

Means for continuously drawing parallel ruled lines at arbitrary positions will now be described. This process to continuously draw ruled lines is started by designating this process by the keyboard or P.D. key. FIG. 9-1 shows a control flowchart for the process to continuously draw ruled lines. First, a basic line is determined in step 1. The basic line is decided by a method whereby the cursor is moved by the P.D. key onto a ruled line which has already been drawn and the one click access is executed or a method whereby a ruled line is extended (41 in FIG. 9-2). In the next step 2, the cursor 20 is moved to a position where the operator wants to draw a ruled line which is parallel with the basic line and the one click access is executed. In steps 4 to 7, the record in which the x-coordinates of the basic line in the case where the basic line is a vertical line or the y-coordinates of the basic line in the case where the basic line is a horizontal line was replaced to the coordinate of the grid which is nearest to the click access position is registered (FIG. 10). By repeating the one click access in step 2 and subsequent steps, the parallel lines can be continuously drawn.

[Erase ruled lines]

The movement of the text data by erasing ruled lines will now be described.

First, FIG. 11A shows a control flowchart regarding the erasure of the horizontal ruled lines. In step 1, a check is made to see if the horizontal line to be erased has a text or not (namely, to see if the text offset of the horizontal line record in FIG. 4 is not set to "−1" or not). If NO, that is, if the text offset is set to "−1", the horizontal line record is erased (step 5). If the horizontal line has a text, a check is made in step 2 to see if a cell exists above the horizontal line or not. If NO in step 2, the text data is erased in step 4 and the ruled line data is erased in step 5 (in such a case of the erasure of $H_3$ in FIG. 12-1B). If a cell exists above the horizontal line (in such a case of the erasure of $H_1$ in FIG. 12-1A), it is regarded that the cells $C_1$ and $C_2$ are combined by erasing the ruled lines. In step 3, the text data of $H_1$ is combined with the text data which the $H_2$ keeps and which is the text data of the cell above the horizontal line, thereby obtaining a result as shown on the left side in FIG. 12-1A. The combination of the texts which is used in the invention is executed on the basis of the attribute of the destination cell by the contents of "aldp" and the like of the attribute table of the cell in FIG. 4. That is, assuming that one of the attributes of the cell $C_1$ is "centering" in FIG. 12-1A, the attribute of the cell which is produced by erasing the $H_1$ is also set to "centering", so that "あ あ い い" of the combined text is centered. The same shall also be applied to the combination of other texts.

Figures 2, 3, 3B:
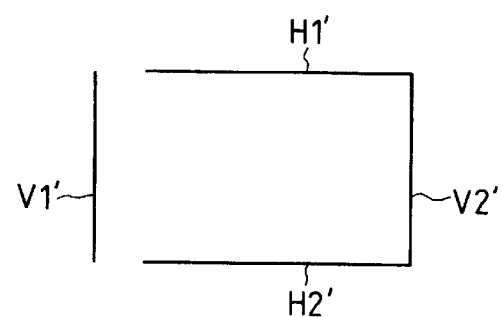
Figures 1C, 12:
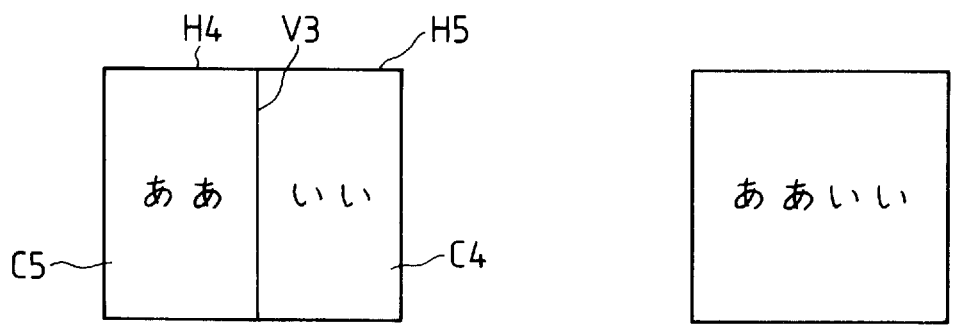
Figures 2A, 12:
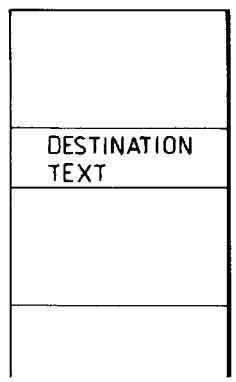
Figures 2B, 12:
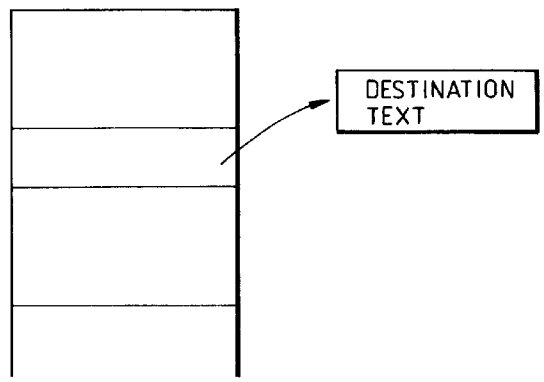
Figures 2C, 12:
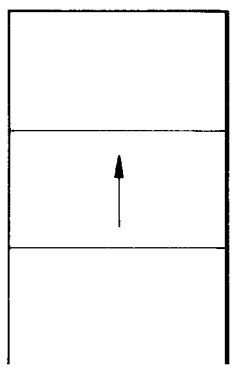
Figures 2D, 12:
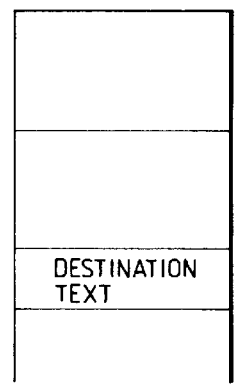
Figures 2E, 12:
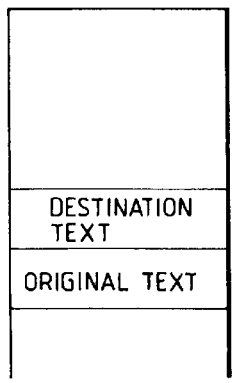
Figures 3A, 12:
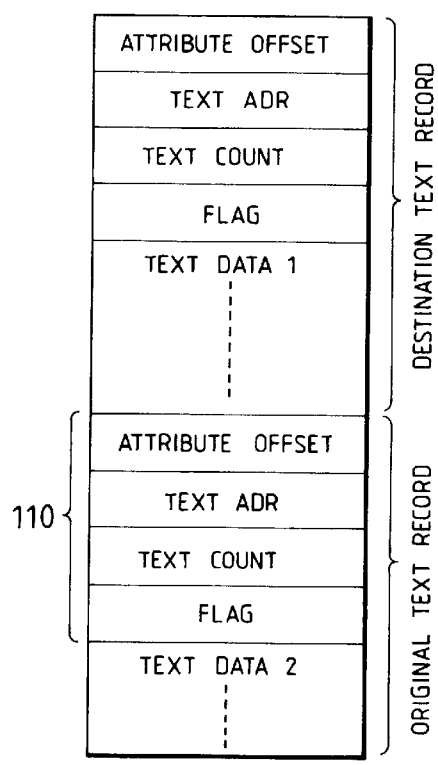
Figures 3B, 12:
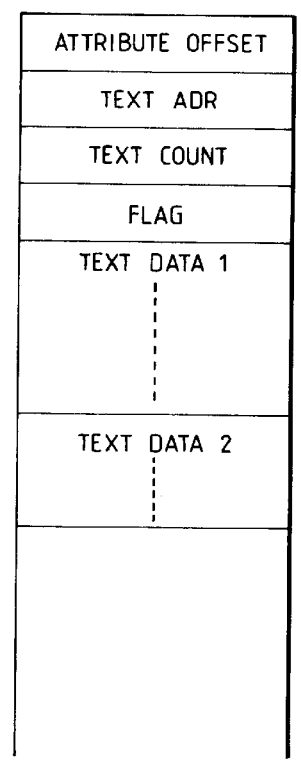

Rearrangement of the character train in the table combining process, that is, the combination of characters will now be described with reference to FIGS. 12-2 to 12-3. FIG. 12-2 is a diagram showing only the text table of FIG. 4. First, as shown in FIG. 12-2A, a certain destination text (text record which the $H_2$ keeps in the example of FIG. 12-1A) is extracted as shown in FIG. 12-2B and the text tables after the extracted text records are shifted to the front side as shown in FIG. 12-2C. At this time, since the text offsets of the horizontal lines which keep the shifted text records are deviated, the text offsets of the records of the horizontal line table are sequentially checked. The size of the destination text is subtracted from the text offsets of the line records having the text offsets larger than the offset of the destination text. Thus, the text offsets of all of the horizontal ruled lines are corrected. Next, the extracted destination text is inserted to the last position in the text table and the position at which the destination text was inserted is stored into the text offset of the destination horizontal line record. Next, in a manner similar to the above, an original text is also moved to the position after the destination text so as to become a state of FIG. 12-2E. FIG. 12-3A shows the destination and original text records which were moved to the last position in the text table. Next, a header portion (110 in FIG. 12-3A) of the original text record is extracted and the subsequent text records are shifted to the front position so as to become a state as shown in FIG. 12-3B. The text count of the original text record is added to the text count of the destination text record. Further, by setting the text offset of the original horizontal ruled line record into "1", the text combination is completed.

FIG. 11B is a control flowchart when the vertical line was erased. In step 1, a check is made to see if a vertical line to be erased is a line constructing the left side of the cell or not. If NO, the line record is erased in step 5 and the processing routine is finished. If YES (for instance, $V_1$ in FIG. 12-1B), a check is made to see if the left upper end horizontal ruled line $H_3$ of the cell ($C_3$ in FIG. 12-1B) has a text or not (step 2). If NO, step 5 follows. If YES, a check is made to see if a cell exists on the left side of the vertical ruled line or not (step 3). If NO, step 5 follows. If YES (for instance, in the case of erasing the $V_3$ in FIG. 12-1C), the text is combined with the cell on the right side in step 4 (the text of $H_5$ is combined to the text of $H_4$).

[Move ruled line]

(Move horizontal ruled line)

Figure 14A:
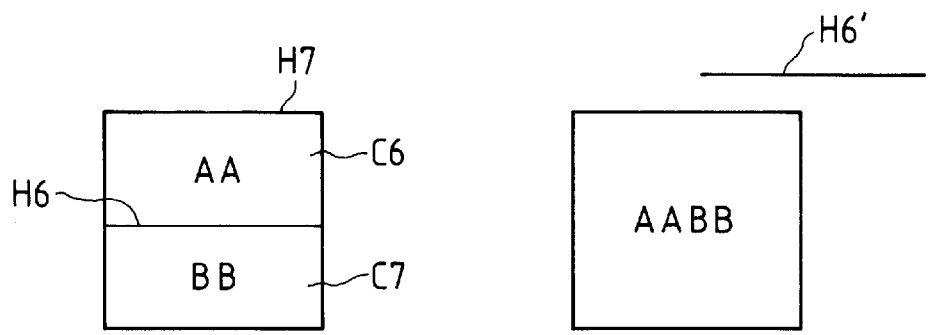
FIGS. 14A to 14C are explanatory diagrams for moving horizontal ruled lines.
Figure 14B:
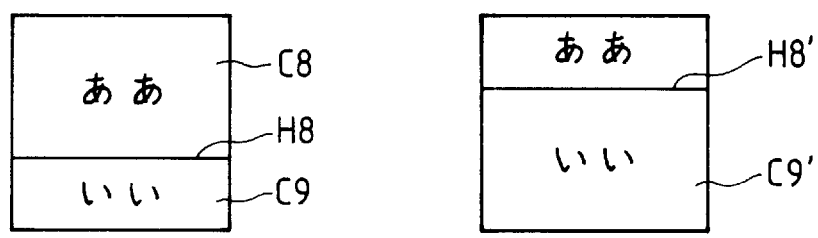
Figure 14C:
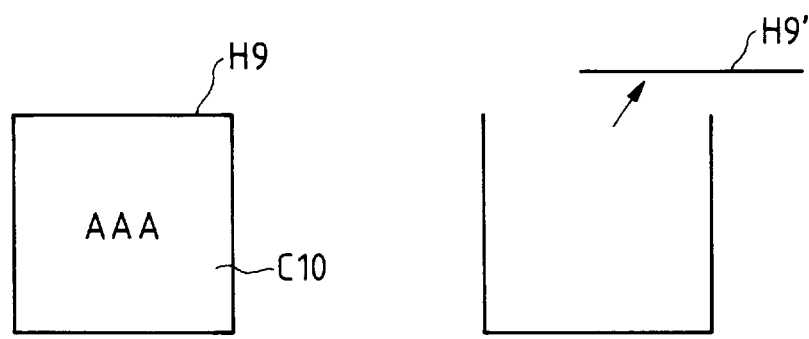

The movement of the horizontal ruled line will now be described. FIG. 13 is a control flowchart thereof. First, in step 1, a check is made to see if a ruled line to be moved has text data or not (to see if the text offset of the horizontal ruled line record in FIG. 4 is not set to "−1" or not). If NO ("−1"), the horizontal line is moved. If YES, a check is made in step 2 to see if a cell exists above the horizontal ruled line or not. If NO, the text data is also moved together with the ruled line ($H_9$ in FIG. 14C is moved to a position of H9'. Although the H9' has a text, since the cell becomes a non-cell, no text is displayed as shown in the right side in FIG. 14C). If a cell exists above the horizontal line, a check is made in step 3 to see if the resultant image obtained by moving the ruled line constructs a cell or not. If a cell also exists on the destination side (when $H_8$ in FIG. 14B is moved to $H_8$', the destination position is set to a cell 9'), the text data is moved together with the ruled line. If the destination is not a cell ($H_6$ in FIG. 14A is moved to $H_6$'), the text data of the ruled line is combined with the text data of the cell above this line (the text of $H_6$ is combined to $H_7$) in step 4. This combining process is similar to that described in FIGS. 12-2 and 12-3.

(Move vertical ruled line)

Figure 15:
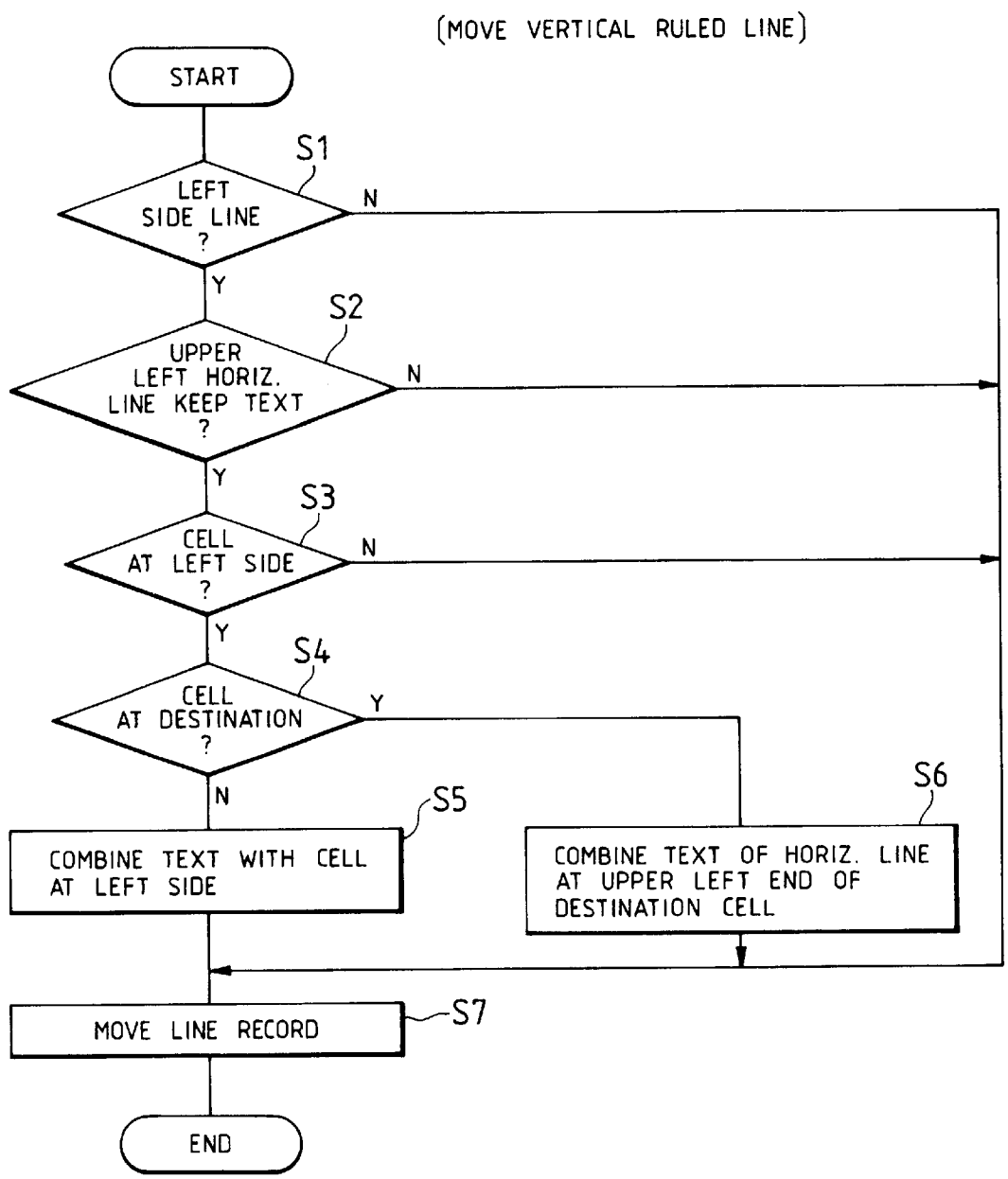
FIG. 15 is a control flowchart for moving vertical ruled lines.

The movement of the vertical line will now be described. FIG. 15 is a control flowchart thereof.

First, in step 1, a check is made to see if a ruled line to be moved constructs the left side of a cell or not.

Figure 16A:
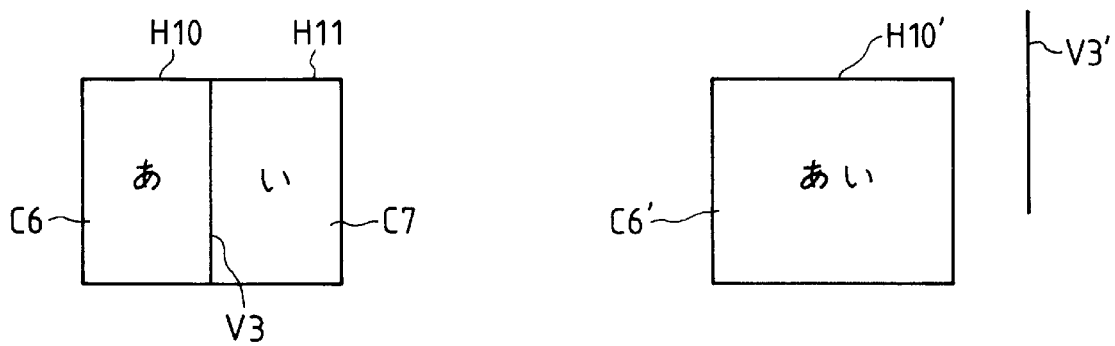
FIGS. 16A to 16C are explanatory diagrams for moving vertical ruled lines.
Figure 16B:
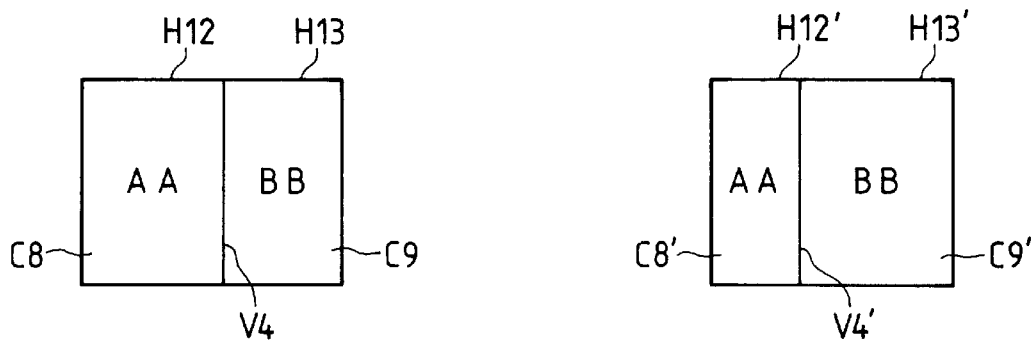
Figure 16C:
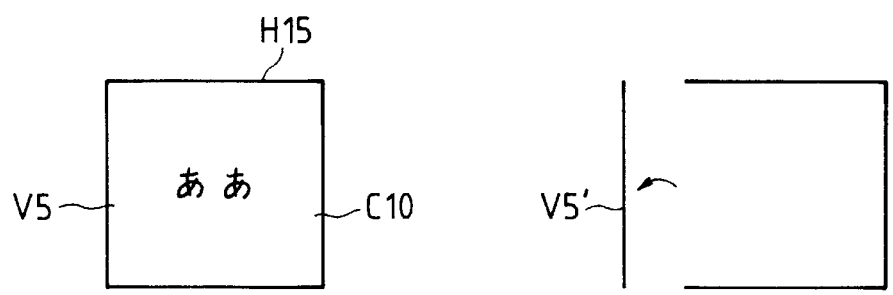

If NO, the ruled line is moved in step 7 and the processing routine is finished. If YES, in step 2, a check is made to see if a left upper end horizontal ruled line ($H_{15}$ when $V_5$ in FIG. 16C is moved) of the cell has a text or not. If NO, step 7 follows. If YES, a check is made in step 3 to see if a cell exists on the left side of the ruled line to be moved. If NO, step 7 follows ($V_5$ in FIG. 16C is moved to $V_5$'; since the cell becomes a non-cell, the text of $H_{15}$ is not displayed). If YES in step 3, step 4 follows and a check is made to see if a cell exists on the destination side. If YES, step 1 follows and the text of the left upper end horizontal-ruled line of the cell on the original side is combined with the left upper end horizontal ruled line of the cell on the destination side (the text of $H_{13}$ in FIG. 16B is combined with the text of $H_{13}$'). If NO ($V_3$ in FIG. 16A is moved to $V_3$'), the text of the left upper end horizontal ruled line ($H_{11}$) of the cell on the original side is combined with the text of the left upper end horizontal ruled line ($H_{10}$) of the cell ($C_6$) on the left side of the ruled line to be moved (to thereby obtain the text of a ruled line of $H_{10}$').

[Erase cell]

Figure 17A:
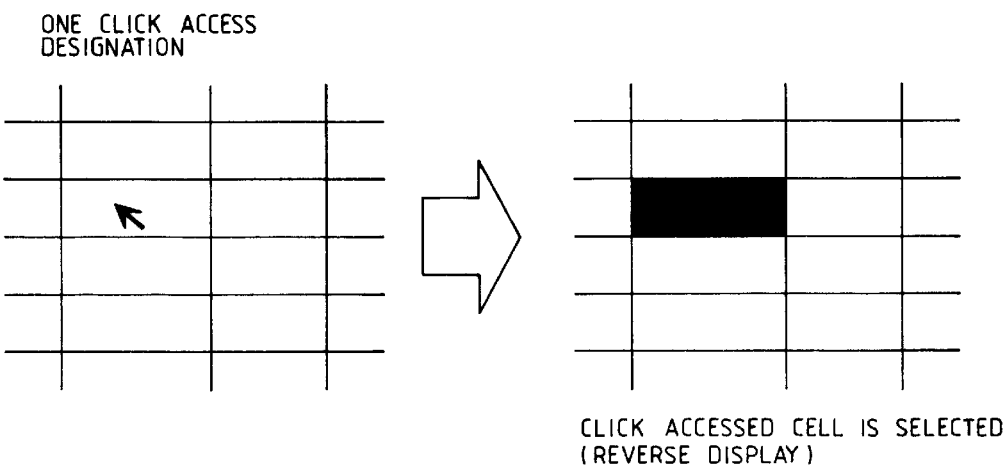
FIGS. 17A and 17B are explanatory diagrams for erasing a cell.
Figure 17B:
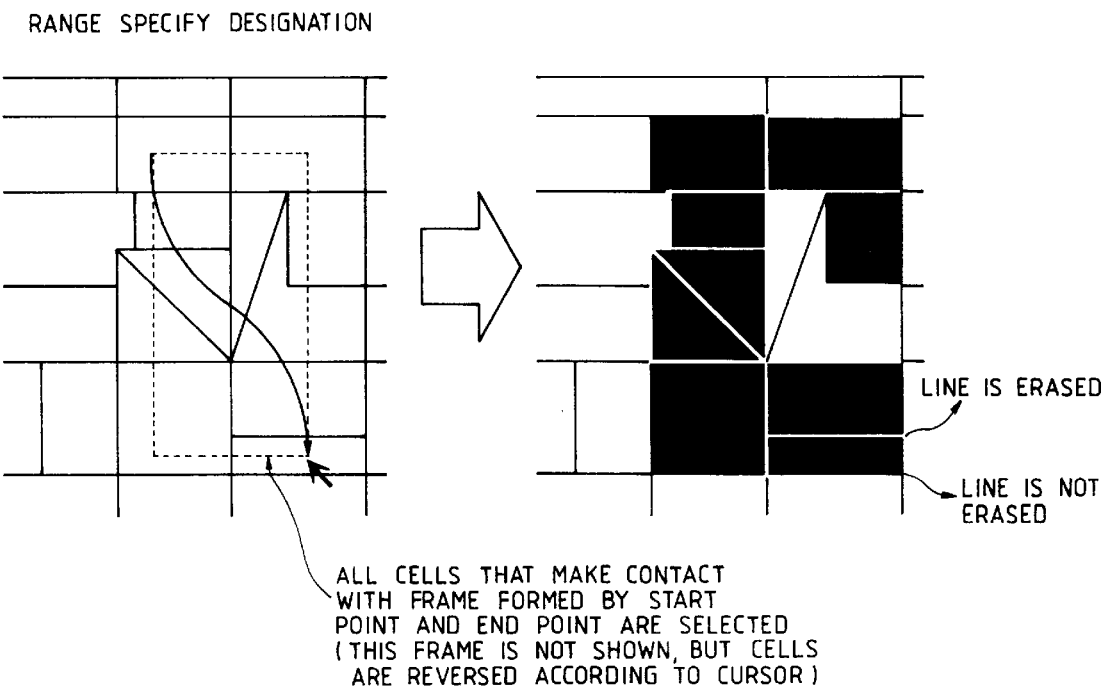
Figure 18:
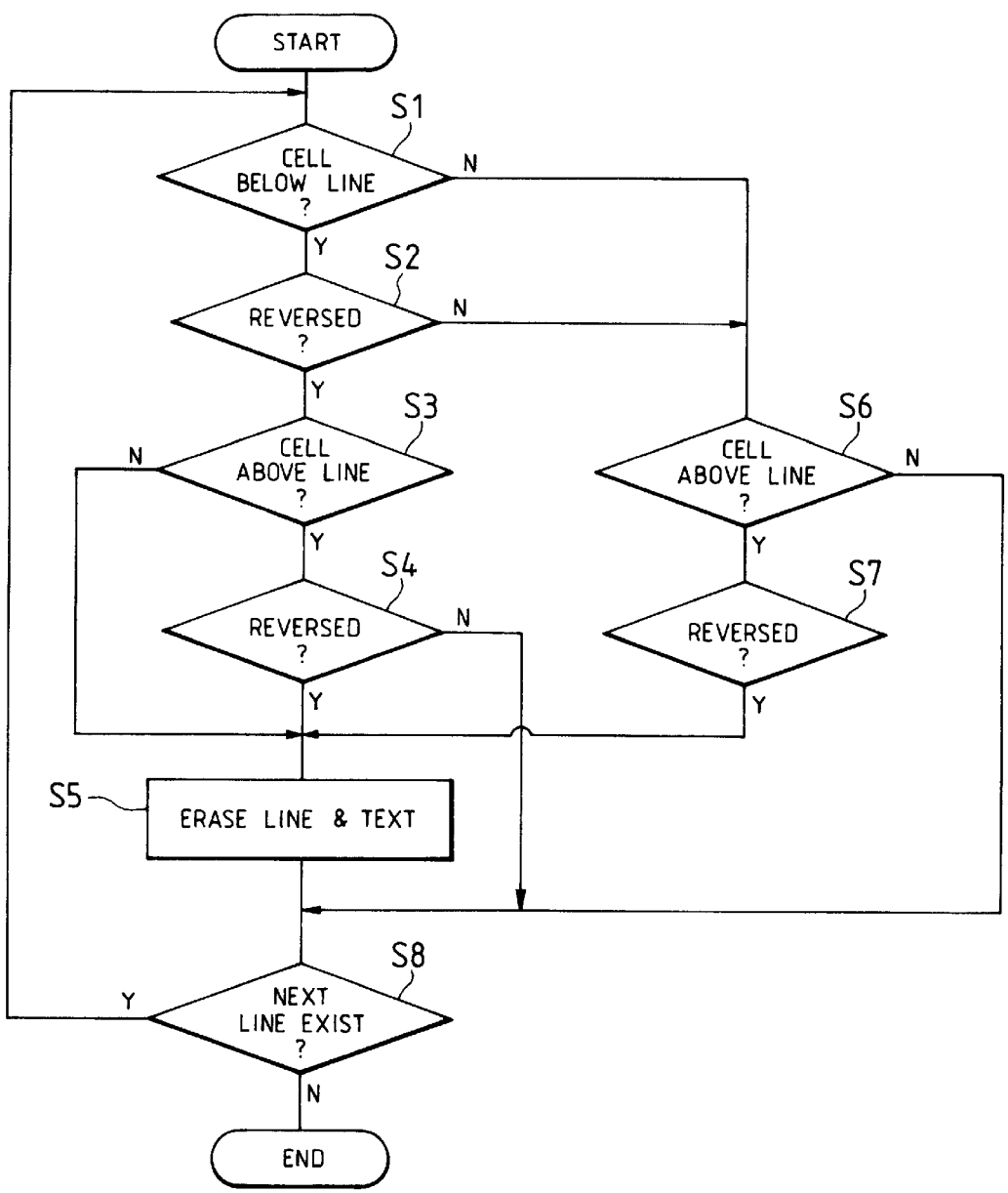
FIG. 18 is a control flowchart for erasing a cell.

A method of erasing ruled lines on a cell unit basis without breaking a cell adjacent to a cell to be erased will now be described. First, the erasure of a cell is designated by the keyboard or P.D. key. Next, if the operator wants to erase one cell, this cell is one click accessed by the P.D. key (FIG. 17A). If the operator desires to erase a plurality of cells, as shown in FIG. 17B, the P.D. key is pressed and the cursor is moved with the P.D. key continuously pressed to thereby designate a range. Then, the P.D. key is released. In this case, all of the cells which are in contact with a rectangle (shown by a broken line in FIG. 17) which is formed by two points of the position at which the P.D. key was depressed and the position at which it is released are subjected to the cell erasing process and are reversely displayed. If the cell to be erased is designated, the horizontal line records in the ruled line table in FIG. 4 are first sequentially processed as shown in a control flowchart shown in FIG. 18. In the first step 1, a check is made to see if a cell exists below the ruled line or not. In other words, a check is made to see if the ruled line constructs the upper side of the cell or not. If YES, a check is made in step 2 to see if the cell has been reversed or not (to see if the cell is subjected to the cell erasing process or not). If YES, a check is made in step 3 to see if a cell exists above the line or not (to see if the ruled line constructs the lower side of the cell or not). If YES, a check is made to see if the cell has been reversed or not in step 4. If YES, step 5 follows and the text record indicated by the text offset of the ruled line is erased and the ruled line record is erased. If the cell above the line is not reversed in step 4, when the next ruled line exists in step 8, the processing routine is repeated from step 1. If the next ruled line does not exist, the processing routine is finished. If NO in step 3, both of the text record and the line record are erased in step 5. On the other hand, if no cell exists below the ruled line in step 1 or if the cell below the line is not reversed in step 2, a check is made in step 6 to see if a cell exists above the ruled line or not. If NO, the processing routine advances to the next ruled line in step 8. If a cell exists above the ruled line, a check is made in step 7 to see if the cell above the line has been reversed or not. If YES, both of the ruled line and the text record are erased. If NO, the processing routine advances to the next ruled line.

The similar processes are also executed for a vertical ruled line. However, in the case of the vertical ruled line, a check is made to see if a cell exists on the right side of the line or not in place of checking whether a cell exists below the ruled line or not in steps 1 and 2. Also, a check is made to see if a cell exists on the left side of the line or not in place of checking whether a cell exists above the ruled line or not in steps 3, 4, 6, and 7. In this manner, the similar processes can be executed. On the other hand, since the vertical ruled line does not have a text, the erasure of the text record is not executed in step 5.

By executing the foregoing processes for all of the horizontal and vertical lines, all of the ruled lines constructing the sides of the cells excluding the cells adjacent to the ruled lines existing at the boundary between the reversed cells can be erased. The cells can be erased without loosing the cells adjacent to a cell to be erased.

As described above, the present invention has the following advantages.

By providing means for drawing a plurality of parallel ruled lines at regular intervals and means for continuously drawing a parallel ruled line at an arbitrary position, a table can be promptly made by a few operations in accordance with a demand of the operator.

When a ruled line is erased or moved, by determining the destination side of characters in consideration of the relations among the upper, lower, right, and left positions of the cell as a region to input characters, the occurrence of unnecessary character data which does not belong to any one of the ruled lines is prevented and the document file region can be saved.

As described in detail above, according to the invention, it is possible to provide a document processing apparatus which can draw ruled lines at regular intervals in accordance with the dimension information (for instance, grids) designated.

As described in detail above, according to the invention, it is possible to provide a document processing apparatus which can erase a plurality of cells by simple operations without exerting an influence on the other cells.

As described in detail above, according to the invention, it is possible to provide a document processing apparatus in which a plurality of ruled lines which are parallel with one ruled line and whose lengths are equal to a length of this ruled line can be easily drawn by simple operations.

As described in detail above, according to the invention, it is possible to provide a character processing apparatus in which when ruled lines constructing a certain cell are erased, the character data in this cell can be rearranged on the basis of the other cell information.

As described in detail above, according to the invention, when ruled lines constructing a certain cell are moved, the character data in this cell can be rearranged on the basis of the other cell information.

We claim:

1. A document processing apparatus comprising:

input means for inputting a line number indicating how many ruled lines are to be displayed;

position designating means for designating a reference line and a position on a display screen of display means, the position being movable on the display screen;

determining means for determining line intervals between a plurality of ruled lines such that the ruled lines of the line number input by said input means are arranged at one same line interval between a point on the reference line and a point at the position designated by said position designating means in accordance with the line number input by said input means;

equalizing the intervals between the plurality of lines to an integral multiple of a grid interval so that all the ruled lines are aligned to a grid using the following equation:

(line interval+½ of the grid interval/grid interval)×grid interval;

and display control means for controlling the display means so as to display the plurality of ruled lines at the same equalized line interval determined by said determining means such that the plurality of ruled lines can be displayed at desired equalized intervals by the operator moving the position designated by said position designating means with said position designating means, said display control means comprising a video random access memory.

2. A document processing apparatus according to claim 1, wherein said position designating means also designates an area required for an arithmetic computation by said determining means.

3. A document processing apparatus according to claim 2, wherein said position designating means is adapted to move and designates the area in response to an amount by which said position designating means moves between actuation and release of a key.

4. A document processing apparatus comprising:

display means for displaying a table which is constructed by a plurality of cells, said display means comprising a display screen and each cell being represented by a plurality of ruled lines;

cell designating means for designating cells on said display screen of said display means to be erased;

discriminating means for discriminating whether each cell of said table is designated or not by said cell designating means; and erasure designating means for designating an erasure of at least one cell designated by said cell designating means, said erasure designating means comprising:

means for sequentially analyzing the horizontal and vertical lines of the designated cells comprising:

upper-cell determining means for determining whether each horizontal line of the designated cells forms the upper side of a lower cell and if so, whether the lower cell has been designated by said cell designating means for erasure;

lower-cell determining means for determining whether each horizontal line of the designated cells forms the lower side of an upper cell and if so, whether the upper cell has been designated by said cell designating means for erasure;

means for erasing a horizontal line and text within a cell formed by the horizontal line when said upper-cell determining means determines that the horizontal line forms the upper side of a lower cell designated for erasure by said cell designating means or when said lower-cell determining means determines that the horizontal line forms the lower side of an upper cell designated for erasure by said cell designating means;

right-cell determining means for determining whether each vertical line of the designated cells forms the right side of a right cell to the right of the vertical line and if so, whether the right cell has been designated by said cell designating means for erasure;

left-cell determining means for determining whether each vertical line of the designated cells forms the left side of a left cell to the left of the vertical line and if so, whether the left cell has been designated by said cell designating means for erasure;

means for erasing a vertical line and text within a cell formed by the vertical line when said right-cell determining means determines that the vertical line forms the right side of a right cell designated for erasure by said cell designating means or when said left-cell determining means determines that the vertical line forms the left side of a left cell designated for erasure by said cell designating means.

5. An apparatus according to claim 4, wherein said cell designating means designates a rectangular region, and wherein said discriminating means discriminates which cells are in contact with said rectangular region.

6. A document processing apparatus according to claim 4, wherein said region designating means with a key and designates the region in response to an amount by which said region designating means moves between actuation and release of a key.

7. A document processing apparatus comprising:

means for starting a continuous drawing process;

instruction means for instructing the display of line segments;

display means for displaying line segments on a display screen in accordance with instructions from said instruction means;

means for indicating a position on the display means;

means for designating operations to be performed on said display means at an indicated position indicated by said indicating means comprising an operation of designating a base line segment and an operation of displaying of a line parallel to the base line segment on said display means;

means for actuating the designating means a first time with a single operation at a first indicated position on said display means, and for actuating the designating means a plurality of times after the first time at a plurality of positions, wherein each of said plurality of times after the first time that said actuating means actuates said designating means, said actuating means actuates said designating means with a single operation, wherein actuation of said designating means a first time by said actuating means designates one of the displayed line segments as a base line segment, wherein actuation of said designating means each of said plurality of times after the first time at an indicated position different from the first indicated position causes said display means to display of a line parallel to the base line segment passing through the different indicated position with a single operation when said starting means starts a continuous drawing process;

memory means for storing coordinate data of the base line segment determined by said designating means;

detecting means for detecting whether the base line segment designated by said designating means is a vertical line segment or a horizontal line segment; and control means for controlling said display means in response to a single operation of said actuating means a second time after the first time said actuating means actuates said designating means, so as to display a vertical line segment identical to the base line segment at the position indicated by said position indicating means different from the first indicated position if the base line segment is detected to be a vertical line segment and to display a horizontal line segment identical to the base line segment at the indicated position different from the first indicated position if the base line segment is detected to be a horizontal line segment when said starting means starts a continuous drawing process, wherein said control means includes a video random access memory, and wherein said control means controls said display means, in response to a single operation of said actuating means when said indicating means indicates a position other than said first indicated position after the second time said actuating, means actuates said designating means, so as to display a vertical line segment identical to the base line segment at the position indicated by said position indicating means different from the first indicated position if the base line segment is detected to be a vertical line segment and to display a horizontal line segment identical to the base line segment at the indicated position if the base line segment is detected to be a horizontal line segment when said starting means starts a continuous drawing process.

8. An apparatus according to claim 7, wherein said position indicating means is a cursor which is displayed on said display means.

9. A document processing apparatus according to claim 7, wherein the parallel line segments are parallel horizontally or vertically on the screen.

10. A document processing apparatus comprising:

memory means for storing information relating to a table comprising a plurality of cells, a format of each cell, and one or more characters to be displayed in each of the cells;

display means for displaying the table;

means for identifying at least one ruled line included in the table displayed by said display means; and control means, responsive to an instruction for erasing a desired ruled line in the displayed table and to a determination that a new cell is formed from the plurality of cells due to erasure of the desired ruled line, for controlling said display means to erase the desired ruled line and to rearrange and display in the new cell the characters formerly displayed in the plurality of cells composed of the at least one ruled line identified by said identifying means on the basis of the format corresponding to the new cell.

11. An apparatus according to claim 10, wherein said control means has discriminating means for discriminating whether a character to be erased has character information or not.

12. An apparatus according to claim 10, wherein said control means includes means for making one cell by combining two cells because the characters between two cells is erased.

13. An apparatus according to claim 10, wherein said control means rearranges the characters in the new cell on the basis of one of predetermined formats.

14. A document processing apparatus comprising:

memory means having a memory section to store data representing a plurality of cells included in a table, each of said plurality of cells comprising a plurality of cell elements which form each cell, and a memory section to store character data representing characters included in the table;

display means for displaying the table, and thereby displaying the plurality of cells and the plurality of elements comprising the plurality of cells, based on the data stored in said memory means, and for displaying the at least one character included in at least one cell of the table;

movement indicating means for indicating a movement of one of the cell elements on a display screen of said display means, wherein said one cell element to be moved is an element of a first cell having a character therein;

first discriminating means for discriminating whether there is a second cell adjacent to said element to be moved;

second discriminating means for discriminating whether said element to be moved becomes part of a third cell after being moved in accordance with an indication from said movement indicating means; and control means for controlling said display means so as to move and display at least one character included in the first cell together with at least one character included in the second cell when said first discriminating means discriminates that there is a second cell adjacent said element to be moved and said second discriminating means discriminates that said element to be moved does not become part of the third cell after being moved.

15. An apparatus according to claim 14, wherein said element to be moved is part of a cell having a character therein.

16. An apparatus according to claim 14, wherein the adjacent cell in the region near the cell comprising said element to be moved is a cell positioned above said element to be moved or on the left side thereof.

17. A document processing apparatus according to claim 14, wherein the second cell has at least one character therein.

18. A document processing apparatus according to claim 17, further comprising third discriminating means for discriminating whether said element to be moved is part of a cell containing at least one character, wherein said at least one character is not displayed when said first discriminating means discriminates that there is no cell adjacent to said element to be moved and when said second discriminating means discriminates that said element to be moved is not part of a cell when moved and when said third discriminating means discriminates that said element to be moved is part of a cell containing at least one character before being moved.

19. A document processing apparatus according to claim 14, wherein when said first discriminating means discriminates that there is a second cell adjacent to the element to be moved and when said second discriminating means discriminates that said element to be moved is part of a cell when said element to be moved is moved, characters are arranged in the cell of which said element to be moved forms a part when moved.

20. A document processing method comprising the steps of:

inputting into a document processing apparatus a line number indicating how many ruled lines are to be displayed;

designating a reference line and a position on a display screen of display means, the position being movable on the display screen;

determining line intervals between a plurality of ruled lines such that the ruled lines of the line number input by said inputting step are arranged at one same line interval between a point on the reference line and a point at the position designated by said position designating step in accordance with the line number which is input in said inputting step;

equalizing the intervals between the plurality of lines to an integral multiple of a grid interval so that all the ruled lines are aligned to a grid using the following equation:

(line interval+½ of the grid interval/grid interval)×grid interval;

and controlling the display screen using a video random access memory so as to display the plurality of ruled lines at the same equalized line interval determined in said determining step such that the plurality of ruled lines are displayed at desired intervals by the operator moving the position in said designating step.

21. A processing method according to claim 20, wherein said position designating step comprises the step of designating an area required for an arithmetic computation in said computing step.

22. A processing method according to claim 21, wherein said position designating step further comprises the step of moving a key and designating the area in response to an amount by which the key moves between actuation and release thereof.

23. A document processing method comprising the steps of:

displaying on a display screen a table which is constructed by a plurality of cells, each cell being represented by a plurality of ruled lines;

designating cells on the display screen to be erased;

discriminating whether each cell of the table is designated by said cell designating step; and designating an erasure of at least one cell designated by said cell designating step, said erasure designating step comprising the steps of:

sequentially analyzing the horizontal and vertical lines of the designated cells comprising the steps of:

determining whether each horizontal line of the designated cells forms the upper side of a lower cell and if so, whether the lower cell has been designated by said cell designating step for erasure;

determining whether each horizontal line of the designated cells forms the lower side of an upper cell and if so, whether the upper cell has been designated by said cell designating step for erasure:

erasing a horizontal line and text within a cell formed by the horizontal line when said upper-cell determining step determines that the horizontal line forms the upper side of a lower cell designated for erasure by said cell designating step or when said lower-cell determining step determines that the horizontal line forms the lower side of an upper cell designated for erasure by said cell designating step;

determining whether each vertical line of the designated cells forms the right side of a right cell to the right of the vertical line and if so, whether the right cell has been designated by said cell designating step for erasure;

determining whether each vertical line of the designated cells forms the left side of a left cell to the left of the vertical line and if so, whether the left cell has been designated by said cell designating step for erasure; and erasing a vertical line and text within a cell formed by the vertical line when said right-cell determining step determines that the vertical line forms the right side of a right cell designated for erasure by said cell designating step or when said left-cell determining step determines that the vertical line forms the left side of a left cell designated for erasure by said cell designating step.

24. A method according to claim 23, wherein said cell designating step designates the step of designating a rectangular region, and wherein said discriminating step comprises the step of discriminating which cells are in contact with the rectangular region.

25. A method processing method according to claim 23, wherein said region designating step comprises the step of designating the region in response to an amount by which a key moves between actuation and release thereof.

26. A document processing method comprising the steps of:

starting a continuous drawing process, instructing the display of line segments;

displaying line segments on a display screen in response to instructions of said instructing step;

indicating a position on the display means;

designating, with designating means, operations to be performed on the display screen at an indicated position indicated by said indicating step comprising an operation of designating a base line segment and an operation of displaying a line parallel to the base line segment on the display screen;

actuating the designating means a first time with a single operation at a first indicated position on the display screen, and for actuating the designating means a plurality of times after the first time at a plurality of positions, wherein each of said plurality of times after the first time that said actuating step actuates the designating means, said actuating step actuates the designating means with a single operation, wherein actuation of the designating means a first time by said actuating step designates one of the displayed line segments as a base line segment, wherein actuation of the designating means each of said plurality of times after the first time at an indicated position different from the first indicated position causes the display screen to display of a line parallel to the base line segment passing through the different indicated position with a single operation when said starting step starts a continuous drawing process;

storing coordinate data of the base line segment determined by said determining step;

detecting whether the base line segment designated by said designating step is a vertical line segment or a horizontal line segment; and controlling the display screen, using a video random access memory, in response to a single operation of said actuating step a second time after the first time said actuating step actuates the designating means, so as to display a vertical line segment identical to the base line segment at the position indicated by said position indicating step different from the first indicated position if the base line segment is detected in said detecting step to be a vertical line segment, and so as to display a horizontal line segment identical to the base line segment at the position indicated by said position indicating step different from the first indicated position if the base line segment is detected in said detecting step to be a horizontal line segment when said starting step starts a continuous drawing process, and wherein said controlling step controls the display screen, in response to a single operation of said actuating step when said indicating step indicates a position other than the first indicated position after the second time said actuating step actuates the designating means, so as to display a vertical line segment identical to the base line segment at the position indicated by said position indicating step different from the first indicated position if the base line segment is detected to be a vertical line segment and to display a horizontal line segment identical to the base line segment at the indicated position if the base line segment is detected to be a horizontal line segment when said starting means starts a continuous drawing process.

27. A method according to claim 26, wherein said position indicating step comprises the step of indicating the position with a cursor displayed on the display screen.

28. A document processing method according to claim 26, wherein said displaying step further comprises the step of displaying the line segment and the base line segment horizontally or vertically parallel to each other on the screen.

29. A document processing method comprising the steps of:

storing information relating to a table comprising a plurality of cells, a format of each cell, and one or more characters to be displayed in each of the cells;

displaying the table on display means;

identifying at least one ruled line included in the table displayed on the display means in said displaying step;

and controlling the display means to erase a desired ruled line in the displayed table and to rearrange and display in a new cell formed from the plurality of cells due to the erasure of the desired ruled line, the characters formerly displayed in the plurality of cells composed of the at least one ruled line identified in said identifying step on the basis of the format corresponding to the new cell in response to an instruction for erasing the desired ruled line and to a determination that a new cell is formed from the plurality of cells due to erasure of the desired ruled line.

30. A method according to claim 21, further comprising the step of discriminating the presence of characters in the plurality of cells and erasing one of the characters.

31. An apparatus according to claim 29, further comprising the step of making one cell by combining two cells because one character between two cells is erased.

32. A document processing method comprising the steps of:

storing data representing a plurality of cells included in a table, each of the plurality of cells comprising a plurality of cell elements which form each cell, and storing character data representing characters included in the table;

displaying the table and thereby displaying the plurality of cells and the plurality of elements comprising the plurality of cells, based on the data stored in said storing step, and displaying the at least one character included in at least one cell of the table;

indicating a movement of one of the cell elements on a display screen, wherein the one cell element to be moved is an element of a first cell having a character therein;

discriminating whether there is a second cell adjacent to the element to be moved; and discriminating whether the element to be moved becomes part of a third cell after being moved in accordance with an indication in said movement indicating step;

wherein said displaying step comprises the step of moving and displaying at least one character included in the first cell together with at least one character included in the second cell when said first discriminating step discriminates that there is a second cell adjacent the element to be moved and said second discriminating step discriminates that the element to be moved does not become part of the third cell after being moved.

33. A processing method according to claim 32, wherein the element to be moved is part of a cell having a character therein.

34. A processing method according to claim 32, wherein the second cell adjacent to the cell comprising the element to be moved is a cell positioned above the element to be moved or on the left side thereof.

35. A document processing method according to claim 32, wherein the second cell has at least one character therein.

36. A document processing method according to claim 35, further comprising the steps of discriminating whether the element to be moved is part of a cell containing at least one character, and not displaying the at least one character when said first discriminating step discriminates that there is no cell adjacent to the element to be moved and when said second discriminating step discriminates that the element to be moved is not part of a cell when moved and when said third discriminating step discriminates that the element to be moved is part of the third cell containing at least one character before being moved.

37. A document processing method according to claim 32, wherein when said first discriminating step discriminates that there is a second cell adjacent to the element to be moved and when said second discriminating step discriminates that the element to be moved is part of a cell when the element to be moved is moved, said method further comprises the step of arranging characters in the cell of which the element to be moved forms a part when moved.

\* \* \* \* \*

UNITED STATES PATENT AND TRADEMARK OFFICE
CERTIFICATE OF CORRECTION

PATENT NO. : 5,867,159

DATED : February 2, 1999

INVENTOR(S): MASAKI HAMADA, ET AL.   Page 1 of 4

It is certified that error appears in the above-identified patent and that said Letters Patent is hereby corrected as shown below:

ON THE COVER PAGE, AT [56] OTHER PUBLICATIONS,
"mmunkation, Elektronki," should read --mmunikation, Elektronik,--.

COLUMN 1,
Line 9, "Document Processing Apparatus" should be deleted.
Line 37, "is" should read --) is--;
Line 50, "rules" should read --ruled--.
Line 67, "amounts" should read --amount--.

COLUMN 3,
Line 25, "FIG." should read --FIGS.--.
Line 61, "used" should be deleted.

COLUMN 4,
Line 2, "drawings" should read --drawing--.
Line 22, "as" should read --as a--.
Line 45, "FIG." should read --Figure--.
Line 53, "a" should be deleted.
Line 65, "edition," should read --editing,--.

COLUMN 5,
Line 7, "out" should be deleted.

UNITED STATES PATENT AND TRADEMARK OFFICE
CERTIFICATE OF CORRECTION

PATENT NO. : 5,867,159

DATED : February 2, 1999

INVENTOR(S): MASAKI HAMADA, ET AL.

It is certified that error appears in the above-identified patent and that said Letters Patent is hereby corrected as shown below:

<u>COLUMN 5 (Cont.)</u>,
Line 11, "super-script" should read --superscript--.
Line 24, "the figure edition," should read --figure editing,--.
Line 30, "edition" should read --editing--.
Line 34, "the image edition," should read --image editing,--.
Line 37, "edition" (both occurrences) should read --editing--.
Line 41, "edition," should read --editing,--.
Line 49, "the edition" should read --editing--.
Line 51, "editions of a ruled line edition" should read --editing processes: ruled-line editing--.
Line 52, "and a character edition" should read --; and character editing--.
Line 54, "edition" should read --editing--.
Line 57, "The character edition" should read --Character editing--.
Line 59, "edition." should read --editing.--.

<u>COLUMN 6</u>,
Line 32, "is stored" should be deleted.

UNITED STATES PATENT AND TRADEMARK OFFICE
CERTIFICATE OF CORRECTION

PATENT NO. : 5,867,159

DATED : February 2, 1999

INVENTOR(S): MASAKI HAMADA, ET AL.

It is certified that error appears in the above-identified patent and that said Letters Patent is hereby corrected as shown below:

COLUMN 7,
Line 23, "the edition" should read --editing--.
Line 36, "rules" should read --ruled--.
Line 62, "grind" should read --grid--.

COLUMN 8,
Line 42, "in such a" should read --in the--.
Line 44, "in such a" should read --in the--.

COLUMN 9,
Line 22, "into" should read --to--, and ""1"," should read --"-1",--.
Line 40, "thereof" should read --thereof.--.
Line 62, Close up right margin.
Line 63, Close up left margin.
Line 64, Close up right margin.
Line 65, Close up left margin.

COLUMN 10,
Line 50, "of" should be deleted.
Line 58, "of" should be deleted.

COLUMN 11,
Line 8, "loosing" should read --losing--.

UNITED STATES PATENT AND TRADEMARK OFFICE
CERTIFICATE OF CORRECTION

PATENT NO. : 5,867,159

DATED : February 2, 1999

INVENTOR(S) : MASAKI HAMADA, ET AL.

It is certified that error appears in the above-identified patent and that said Letters Patent is hereby corrected as shown below:

COLUMN 13,
Line 12, "with a key and" should be deleted.
Line 44, "of" should be deleted.

COLUMN 14,
Line 6, "actuating," should read --actuating--.
Line 45, "is" should read --are--.

COLUMN 15,
Line 20, "in the region near" should read --adjacent to--.

COLUMN 17,
Line 4, "A method" should read --A--.
Line 35, "of" should be deleted.

Signed and Sealed this

Sixteenth Day of November, 1999

Attest:

Q. TODD DICKINSON

Attesting Officer

Acting Commissioner of Patents and Trademarks